US008812753B2

(12) United States Patent
Sumioka et al.

(10) Patent No.: US 8,812,753 B2
(45) Date of Patent: Aug. 19, 2014

(54) INFORMATION PROCESSING APPARATUS, INFORMATION PROCESSING METHOD, AND RECORDING MEDIUM STORING COMPUTER PROGRAM

(75) Inventors: Motoshi Sumioka, Kawasaki (JP); Masahiko Murakami, Kawasaki (JP); Ryuichi Matsukura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 622 days.

(21) Appl. No.: 12/362,061

(22) Filed: Jan. 29, 2009

(65) Prior Publication Data

US 2009/0198987 A1 Aug. 6, 2009

(30) Foreign Application Priority Data

Feb. 1, 2008 (JP) ................................ 2008-023123

(51) Int. Cl.
*G06F 3/00* (2006.01)
(52) U.S. Cl.
USPC ............................................................ 710/36
(58) Field of Classification Search
USPC ............................................................ 710/15
See application file for complete search history.

(56) References Cited

U.S. PATENT DOCUMENTS

| 6,734,886 B1* | 5/2004 | Hagan et al. ................ 715/853 |
| 2002/0035941 A1* | 3/2002 | Nakao ........................... 101/484 |
| 2002/0138592 A1* | 9/2002 | Toft ............................... 709/219 |
| 2002/0186249 A1* | 12/2002 | Lu et al. ........................ 345/781 |
| 2008/0163363 A1 | 7/2008 | Mizutani |
| 2008/0263636 A1* | 10/2008 | Gusler et al. ..................... 726/4 |

FOREIGN PATENT DOCUMENTS

| JP | 04-048373 | 2/1992 |
| JP | 10-320339 | 12/1998 |
| JP | 2000-155726 | 6/2000 |
| JP | 2005-035294 | 2/2005 |
| JP | 2005-259109 | 9/2005 |
| JP | 2005-339133 | 12/2005 |
| JP | 2006-113953 | 4/2006 |

OTHER PUBLICATIONS

Japanese Office Action for corresponding Japanese Application 2008-023123; dated Jan. 31, 2012.

* cited by examiner

*Primary Examiner* — Henry Tsai
*Assistant Examiner* — Juanito Borromeo
(74) *Attorney, Agent, or Firm* — Staas & Halsey LLP

(57) ABSTRACT

An information processing apparatus includes a transceiver unit transmitting and receiving information to and from an external device is provided. The apparatus includes a setting information storage unit storing setting information related to an operating environment in association with user identification information, a judging unit judging whether the information that the transceiver unit transmits to or receives from the external device includes given information, an extraction unit extracting the given information from the information including the given information, a specifying unit specifying a user on the basis of the given information, and a setting unit reading the setting information stored in the setting information storage unit in association with the user identification information and setting the user operating environment on the basis of the setting information.

17 Claims, 20 Drawing Sheets

FIG. 2A

| SITE INFORMATION | MONITORING SITE INFORMATION ||
| --- | --- | --- |
| | URL | FORM NAME |
| ABXYZ | http://login.abxyz.com/login.srf | login |
| ZABC | http://login.zabc.co.jp/config/login | login |
| ⋮ | ⋮ | ⋮ |

FIG. 2B

| SITE INFORMATION | USER ID OF EACH USER ||
| --- | --- | --- |
| | father | sister |
| ABXYZ | father@abxyz.com | sister@abxyz.com |
| ZABC | father@zabc.co.jp | sister@zabc.co.jp |
| ⋮ | ⋮ | ⋮ |

FIG. 2C

| USER NAME | PERSONAL SETTING INFORMATION OF EACH USER ||
| --- | --- | --- |
| | USER DICTIONARY | HISTORY |
| father | father.dic | father.history |
| sister | sister.dic | sister.history |
| ⋮ | ⋮ | ⋮ |

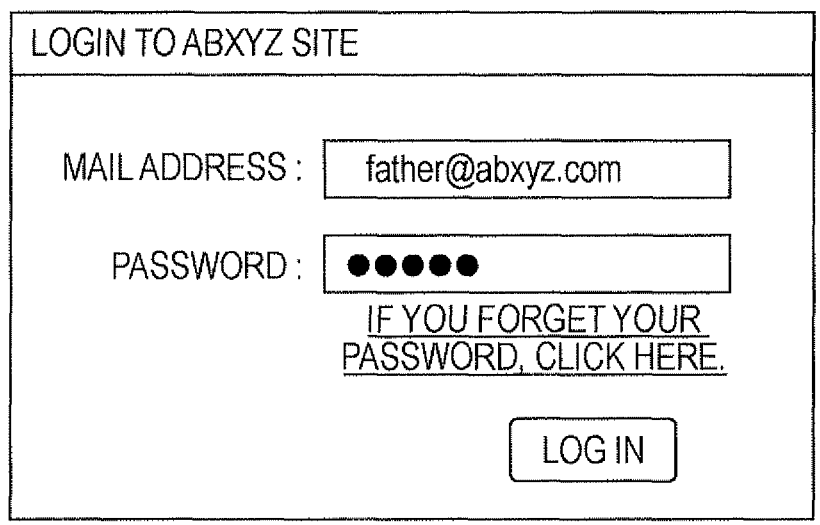

FIG. 6A

| 1 | バイバイ |
|---|---|
| 2 | 売買 |
| 3 | 倍倍 |
| 4 | 倍々 |
| 5 | ばいばい |

FIG. 6B

| 1 | バイバイ |
|---|---|
| 2 | ($··)/~~~ |
| 3 | (@^^)/~~~ |
| 4 | (;_;)/~~~ |
| 5 | (^.^)/~~~ |
| 6 | (^_^)/~ |
| 7 | (ToT)/~~~ |
| 8 | (^^)/~~~ |
| 9 | (T_T)/~~~ |

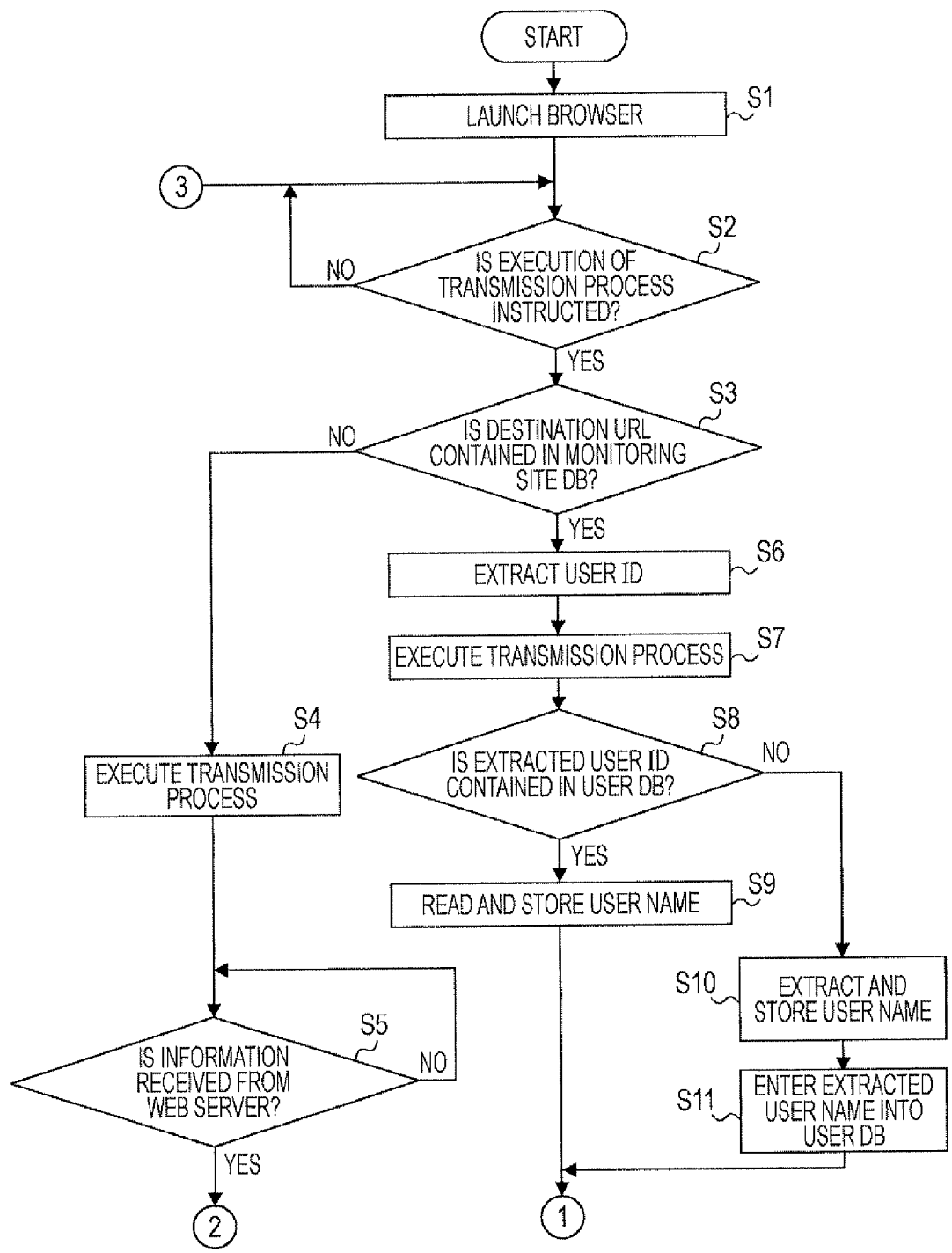

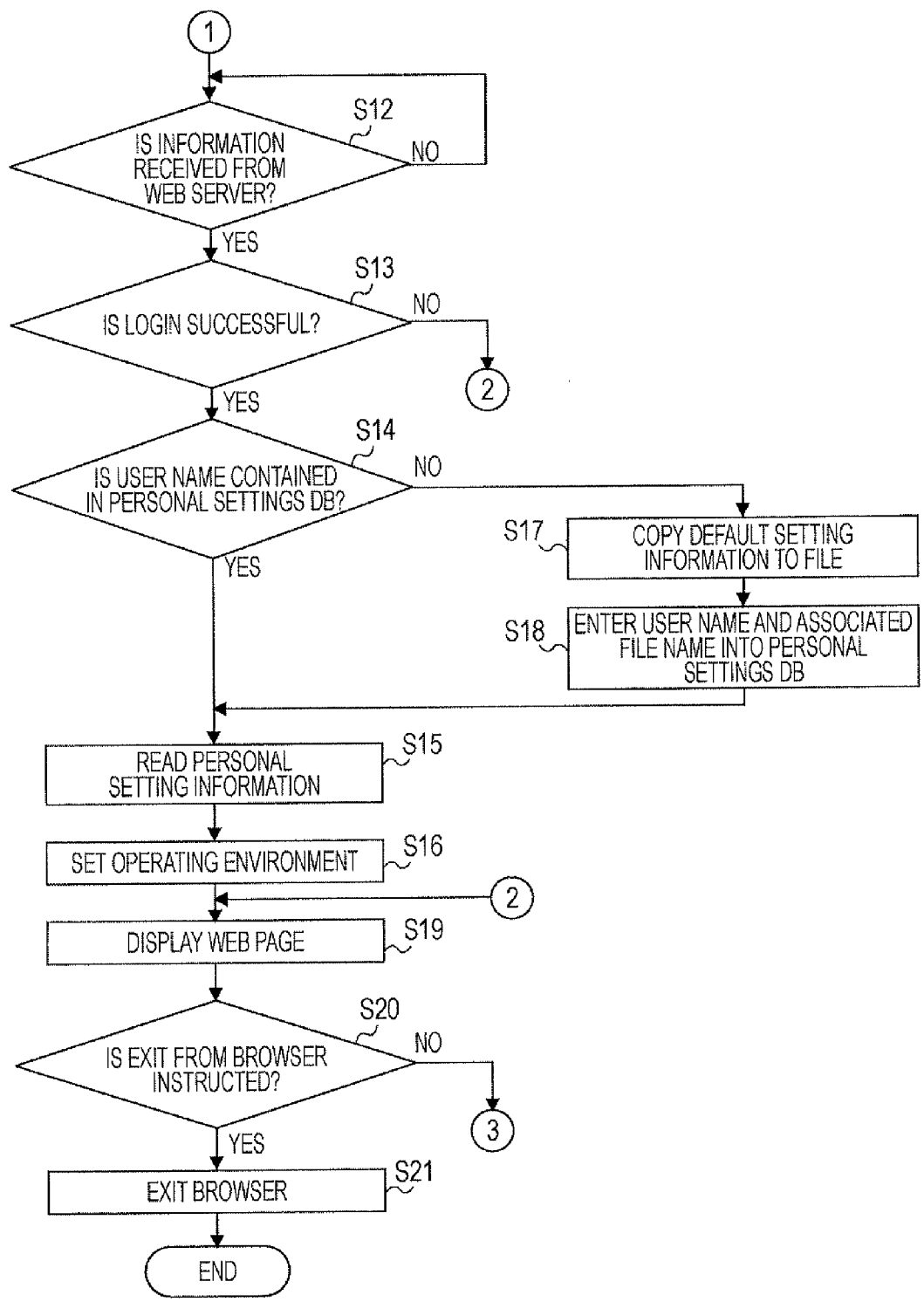

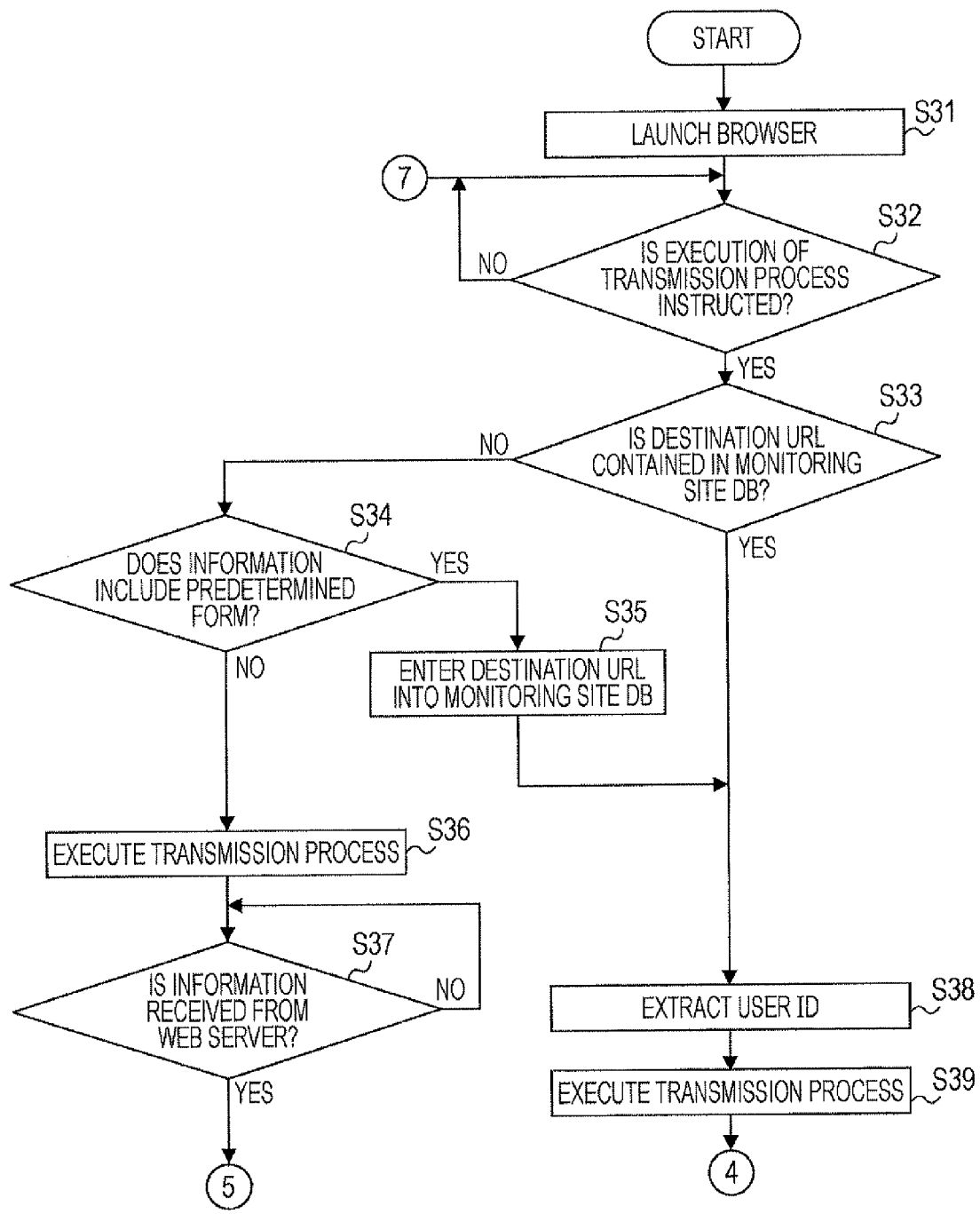

FIG. 14

| SITE INFORMATION | USER ID OF EACH USER ||
|---|---|---|
| | father | sister |
| ABXYZ | father@abxyz.com | sister@abxyz.com |
| ZABC | father@zabc.co.jp | sister@zabc.co.jp |
| OPQOPQ | john@opqopq.co.jp | nmary@opqopq.co.jp |
| MNMN | njohn@mnmn.co.jp | mary@mnmn.co.jp |
| ⋮ | ⋮ | ⋮ |

ENTER YOUR USER NAME

| father |

ENTER YOUR IDENTIFICATION CODE

| * * * * * |

SELECT YOUR USER NAME

| father |
| sister |

YOU ARE LOGGING IN WITH NEW USER ID.
ARE YOU THE SAME PERSON AS LISTED BELOW?

○ "father@abxyz.com" AT ABXYZ SITE
○ "sister@abxyz.com" AT ABXYZ SITE
○ NEITHER OF THEM

OK

INFORMATION PROCESSING APPARATUS, INFORMATION PROCESSING METHOD, AND RECORDING MEDIUM STORING COMPUTER PROGRAM

CROSS-REFERENCE TO RELATED APPLICATIONS

This application is based upon and claims the benefit of priority of the prior Japanese Patent Application No. 2008-23123 filed on Feb. 1, 2008, the entire contents of which are incorporated herein by reference.

FIELD

The embodiments discussed herein are directed to an information processing apparatus that is able to transmit and receive information to and from an external device, an information processing method, and a recording medium that stores a computer program for causing a computer to function as the information processing apparatus.

BACKGROUND

Some multifunctional information processing terminals, such as personal computers, have a multi-user function that allows multiple users to share and use one information processing terminal. For example, Japanese Unexamined Patent Application Publication No. 2006-113953 and Japanese Unexamined Patent Application Publication No. 1992-48373 discuss multifunctional information processing terminals. Such an information processing terminal is set an account for each user and stored wide variety of setting information for the respective accounts. Then, when a login process is performed on the basis of both an account (user ID) and a password corresponding to the account, the information processing terminal provides an environment (operating environment) corresponding to each user on the basis of the setting information of the login user. In addition, when the login user performs a logout process, the information processing terminal ends the provided environment for the login user.

In this way, by switching the environment provided on the basis of the setting information of each user, it is possible to, for example, switch a dictionary and learning history used in a conversion process such as Kana-Kanji conversion (conversion of Kana characters in Japanese into Kanji characters in Japanese: Kanji characters are equal to Chinese characters), a history and favorites of web pages frequently accessed through the Internet, or the like, user by user. Thus, the users are able to easily enter desired characters and easily access desired web pages, so user convenience may be improved.

However, when user environments, which depend on a login process and a logout process as described above, are switched, each user needs to enter an account and a password each time when a login process is performed. In addition, the information processing terminal needs to execute a logout process and a login process each time when the environment is switched. Thus, there is a problem that it is difficult to reduce latency until the user is allowed to use the information processing terminal under the user environment.

In addition, when the information processing terminal is used at home, it can be shared with family members. Thus, the environment is not switched for each user through the login process and the logout process, but all family members use the same environment. In such a usage pattern, the respective users use various settings during usage of the information processing terminal, the information processing terminal obtains learning effects when the respective users use the information processing terminal. As a result, the various settings and the learning effects are mixed among the users who use the same information processing terminal. Thus, a problem exists in difficulty to customize settings for each user and, therefore, it is difficult to improve user convenience.

Further, game machines can include a network connection function, such as Internet connection function. There are increased opportunities to access the Internet using neither the information processing terminals nor the game machines. Such a game machine can be simpler than the information processing terminal. A problem can exist when the game machine does not allow each user to switch the environments, and it is difficult to switch the environment for each user or customize settings.

SUMMARY

It is an aspect of the embodiments discussed herein to provide an information processing apparatus that includes a transceiver unit transmitting and receiving information to and from an external device, a setting information storage unit storing setting information related to an operating environment in association with identification information for identifying a user, a judging unit judging whether the information that the transceiver unit transmits to or receives from the external device includes given information, an extraction unit extracting the given information from the information, when the judging unit judges that the information includes the given information, a specifying unit specifying a user based on the given information, and a setting unit reading the setting information stored in the setting information storage unit in association with the identification information of the specified user, and setting the operating environment based on the read setting information.

BRIEF DESCRIPTION OF THE DRAWINGS

FIG. 2A, FIG. 2B, and FIG. 2C respectively illustrate examples of contents of a monitoring site DB, a user DB and a personal settings DB.

FIG. 4A and FIG. 4B respectively illustrate an exemplary display screen for requesting a login process and exemplary information transmitted to a web server.

FIG. 6A and FIG. 6B respectively illustrate examples of conversion candidates in a Kana-Kanji conversion process.

FIG. 7 illustrates exemplary operations of a process switching an operating environment.

FIG. 8 illustrates exemplary operations of a process switching an operating environment.

FIG. 9 illustrates exemplary operations of a process switching an operating environment.

FIG. 14 illustrates an example of contents of a user DB.

FIG. 16A, FIG. 16B, FIG. 16C, and FIG. 16D respectively illustrate examples of an entry screen.

The object and advantages of the embodiment discussed herein will be realized and attained by means of elements and combinations particularly pointed out in the claims.

It is to be understood that both the foregoing general description and the following detailed and the following detailed description are exemplary and only are not restrictive exemplary explanatory are not restrictive of the invention, as claimed.

DETAILED DESCRIPTION OF THE EMBODIMENTS

Figure 1:
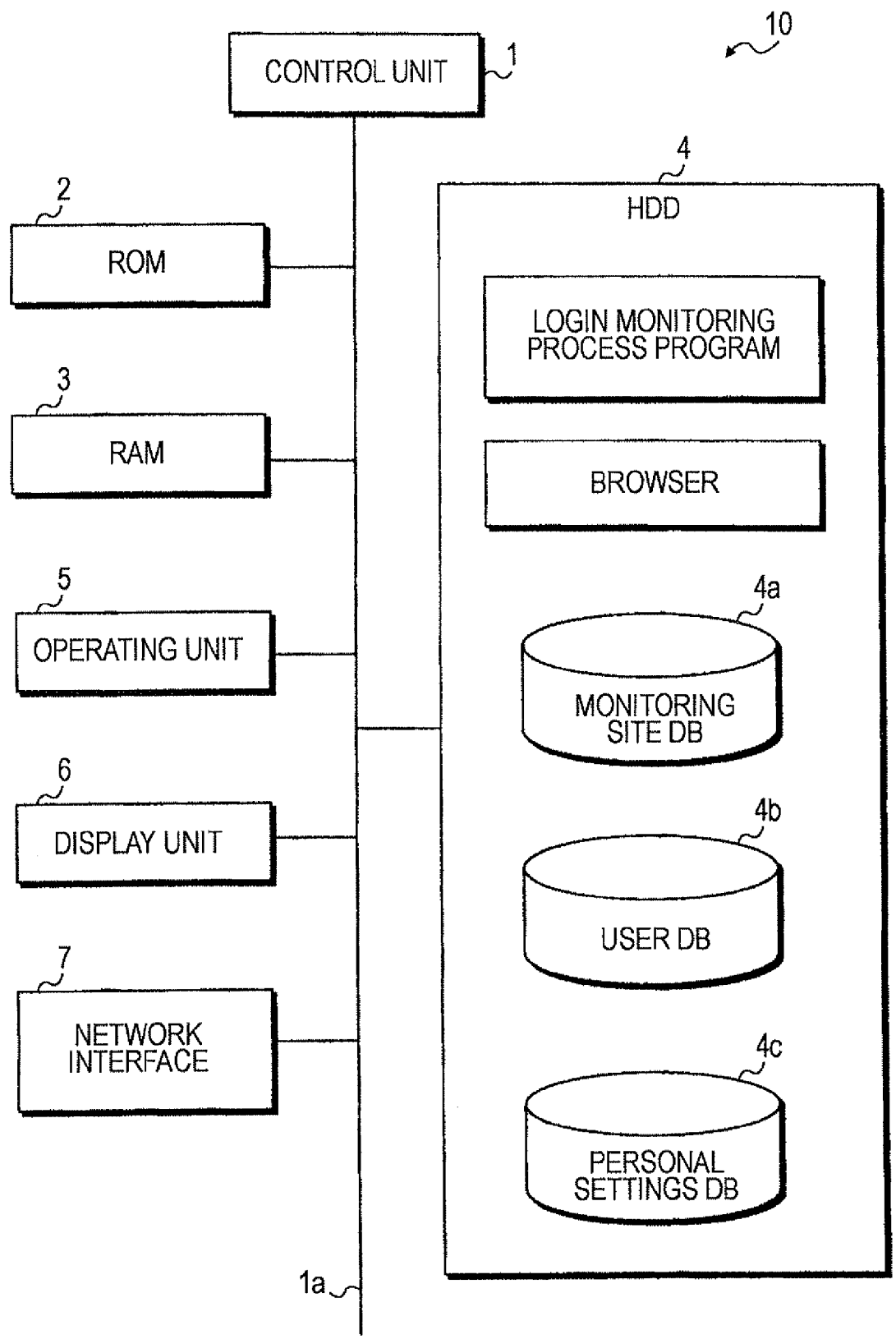
FIG. 1 illustrates an information processing apparatus according to a first exemplary embodiment.

First exemplary embodiment FIG. 1 illustrates an information processing apparatus according to the first exemplary embodiment. The information processing apparatus 10 according to the first exemplary embodiment can be implemented in such a manner that a personal computer, or the like, reads a computer program stored in a recording medium and executes the computer program. Note that application of the information processing apparatus is not limited to the personal computer, but it may be applied to devices, such as a cellular phone, a television, and a game machine, having a network connection function, such as Internet connection function, and a web browser function (hereinafter, referred to as browser) for accessing a web site.

The information processing apparatus 10 of the first exemplary embodiment is, for example, a personal computer. The information processing apparatus 10 can include a control unit 1, a ROM 2, a RAM 3, a HDD (Hard Disk Drive) 4, an operating unit 5, a display unit 6, a network interface 7, and the like. These hardware units can be connected to one another via a bus 1a.

The control unit 1 is a CPU (Central Processing Unit), an MPU (Micro Processing Unit), or the like, having a clock (not illustrated). In accordance with a given timing indicated by the clock, the control unit 1 appropriately reads a control program, which is stored in the ROM 2 or the HDD 4, onto the RAM 3 and executes the control program, while controlling operations of the hardware units. The ROM 2 stores various control programs that are necessary for the information processing apparatus 10 to operate as the information processing apparatus according to the invention. The RAM 3 includes of an SRAM, a DRAM, a flash memory, or the like. The RAM 3 temporarily stores various pieces of data generated at the time when the control programs are executed by the control unit 1.

The HDD 4 is a mass storage device. The HDD 4 stores various programs necessary for the information processing apparatus 10 to operate as the information processing apparatus according to the invention, a login monitoring process program, a browser for accessing a web server (web site), a monitoring site database (hereinafter, referred to as monitoring site DB) 4a illustrated in FIG. 2A, a user database (hereinafter, referred to as user DB) 4b illustrated in FIG. 2B, a personal settings database (hereinafter, referred to as personal settings DB) 4c illustrated in FIG. 2C, and the like. In addition, the HDD (storage) 4 stores screen information for notifying a user, who operates the information processing apparatus 10, of various pieces of information, given setting information as a default of various pieces of setting information, and the like.

The operating unit 5 is a keyboard, a mouse, or the like. The operating unit 5 includes various operation keys necessary for a user, who operates the information processing apparatus 10, in order to operate the information processing apparatus 10. When the user operates an operation key, the operating unit 5 transmits a control signal corresponding to the operated operation key to the control unit 1. The control unit 1 executes a process corresponding to the control signal acquired from the operating unit 5.

The display unit 6 is a liquid crystal display, a CRT (Cathode Ray Tube) display, or the like. The display unit 6 displays an operating state of the information processing apparatus 10, information entered through the operating unit 5, information to be notified to the user, or the like, in accordance with instructions from the control unit 1.

The network interface 7 is an interface to connect with a network, such as the Internet or a LAN (Local Area Network). The network interface 7 operates as a transceiver that transmits or receives information to or from an external device via the network.

In the information processing apparatus 10, the control unit 1 reads browser programs stored in the HDD 4 onto the RAM 3 and executes the browser programs to thereby access a web site on a web server specified by the user via the network and request the web server to provide web pages of the web site. The web server provides requested web pages in response to access from an external device, such as the information processing apparatus 10. The control unit 1 of the information processing apparatus 10 receives the web pages provided from the web server by the network interface 7 and instructs the display unit 6 to display the web pages. By so doing, the user of the information processing apparatus 10 is able to browse desired web pages.

FIG. 2A, FIG. 2B, and FIG. 2C respectively illustrate examples of contents of the monitoring site DB 4a, the user DB 4b and the personal settings DB 4c. As illustrated in FIG. 2A, the monitoring site DB (target information storage unit) 4a contains site information for identifying a web site, a URL (Uniform Resource Locator: target information), a form name that indicates a form to be monitored, and the like, in association with each web site (monitoring site) to be monitored when the control unit 1 executes the login monitoring process program stored in the HDD 4. The control unit 1 enters the contents of the monitoring site DB 4a every time any of the users of the information processing apparatus 10 enters web site information of a monitoring site through the operating unit 5. In addition, the contents of the monitoring site DB 4a may be set at the time of factory shipment of the information processing apparatus 10. In addition, the contents of the monitoring site DB 4a may be entered via a network from a specific administrative server.

As illustrated in FIG. 2B, the user DB 4b contains site information for identifying both web sites and, in association with the user names of the users of the information processing apparatus 10, user IDs (mail addresses) that are used when the users utilize respective web sites. The contents of the user DB 4b are entered by the control unit 1 every time each user of the information processing apparatus 10 enters his or her own user ID through the operating unit 5. In addition, the contents of the user DB 4b are, where necessary, entered by the control unit 1 when the control unit 1 executes the login monitoring process program stored in the HDD 4.

Note that in the first exemplary embodiment, mail addresses are used as user IDs to access web sites, and the user IDs having the same character strings of mail addresses on the left to "@" are utilized by the same user. Thus, in the user DB 4b illustrated in FIG. 2B, both the user IDs "father@abxyz.com" and "father@zabc.co.jp" are used by the user of the user name "father", and both the user IDs "sister@abxyz.com" and "sister@zabc.co.jp" are used by the user of the user name "sister".

As illustrated in FIG. 2C, the personal settings DB (setting information storage) 4c contains information related to personal settings of each user in association with a user name (identification information) for identifying the user for each user that utilizes the information processing apparatus 10. For example, the personal settings DB contains setting information related to an operating environment of the information processing apparatus 10, such as information of a user dictionary and history, to be used in the conversion software of an IME (Input Method Editor). Note that in FIG. 2C, the information of the user dictionary and history only illustrates a file name. However, the path of a file name from a root directory, such as "C:\Documents and Settings\Application Data\father.dic" and "C:\Documents and Settings\Application Data\father.history" may be contained.

The contents of the personal settings DB 4c are entered by the control unit 1 every time each user of the information processing apparatus 10 enters the file name of his or her own user dictionary and history through the operating unit 5. In addition, the contents of the personal settings DB 4c are, whenever necessary, entered by the control unit 1 when the control unit 1 executes the login monitoring process program stored in the HDD 4.

In the information processing apparatus 10, the control unit 1 can execute control programs stored in the ROM 2 or the HDD 4.

Figure 3:
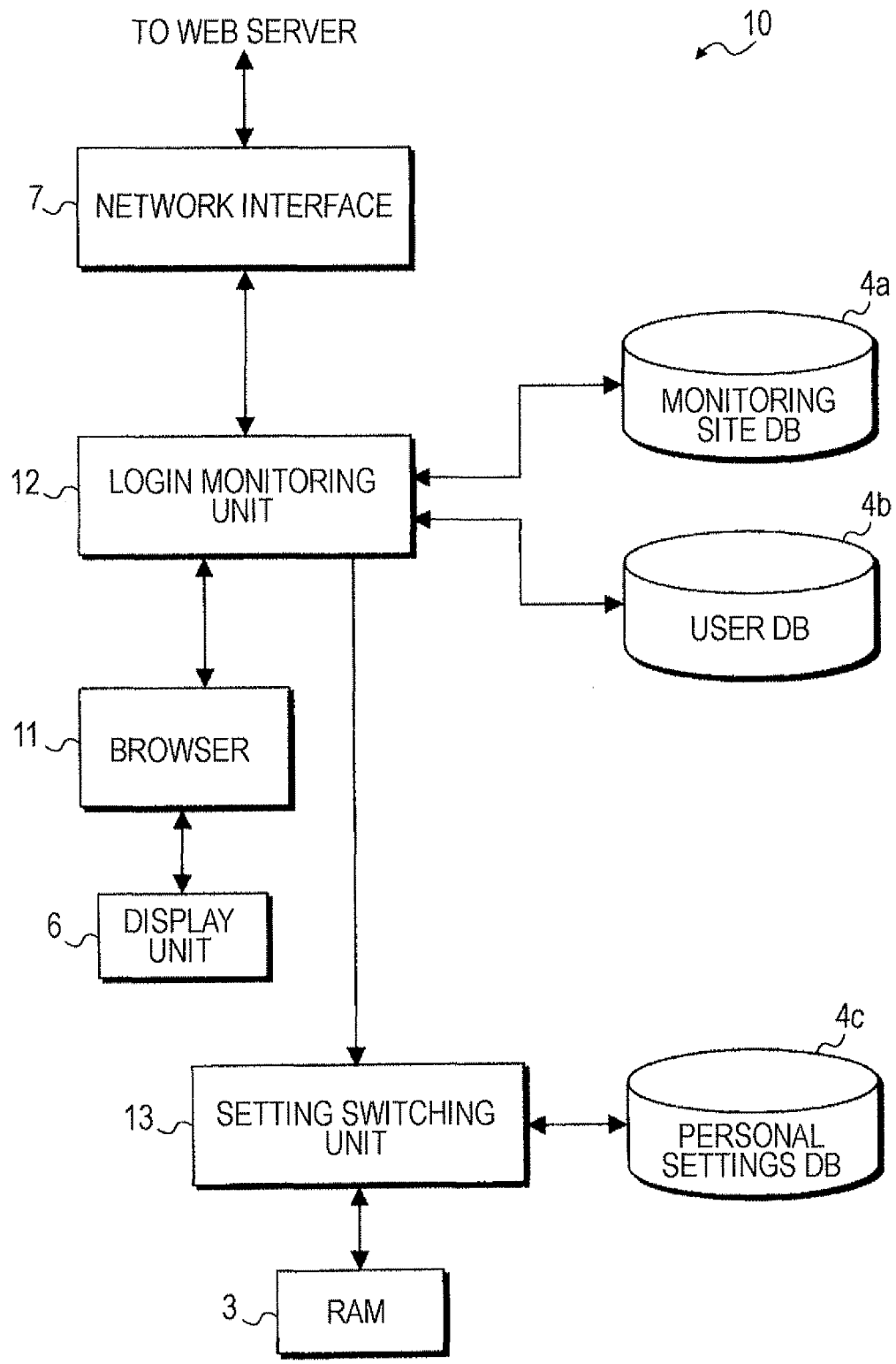
FIG. 3 illustrates an exemplary information processing apparatus.

FIG. 3 illustrates exemplary embodiment of the information processing apparatus 10. In the information processing apparatus 10 according to the first exemplary embodiment, when the control unit 1 executes programs stored in the ROM 2 or the HDD 4, the functions of the browser 11, the login monitoring unit 12, the setting switch unit 13, and the like, are implemented. The control unit 1 implements the function of the browser 11 by executing the browser programs stored in the HDD 4, and implements the functions of the login monitoring unit 12 and the setting switch unit 13 by executing the login monitoring process program stored in the HDD 4.

The browser 11 transmits and receives information to and from a web server that stores web sites specified by the user through the network interface 7. When the browser 11 of the first exemplary embodiment transmits information to the web server through the network interface 7, the browser 11 transfers information, including target information (URL) that indicates the destination web server, to the network interface 7 through the login monitoring unit 12. In addition, when the browser 11 has received web pages from a web site, the browser 11 transfers the received web pages to the display unit 6 and instructs the display unit 6 to display the web page.

The login monitoring unit 12 has a gateway function by which information acquired from the browser 11 is transferred to the network interface 7. In addition, the login monitoring unit 12 that can be used for determining, when the information is transferred from the browser 11, searches the monitoring site DB 4a for target information (URL) included in the transferred information. The login monitoring unit 12 then determines whether the destination web server is a web site contained in the monitoring site DB 4a. When the login monitoring unit 12 fails to retrieve the URL included in the information transferred by the browser 11 from the monitoring site DB 4a. That is, when the login monitoring unit 12 determines that the destination web server is not a web site contained in the monitoring site DB 4a, the login monitoring unit 12 does nothing and just directly transfers the transferred information to the network interface 7.

On the other hand, when the login monitoring unit 12 that can be used for judging succeeds in retrieving the URL included in the information transferred by the browser 11 from the monitoring site DB 4a, that is, when the login monitoring unit 12 determines that the destination web server is a web site contained in the monitoring site DB 4a, the login monitoring unit 12 judges whether the information transferred by the browser 11 includes a form (given information) of which the form name is contained in the monitoring site DB 4a. Websites contained in the monitoring site DB 4a require a login process (user authentication) using both a user ID (mail address) and a password, when they are accessed (browsed). And URLs contained in the monitoring site DB 4a are destinations to which the user ID and the password are transmitted at the time of a login process.

A web site that requires the login process for accessing the web site initially provides a web page for displaying a display screen illustrated in FIG. 4A to the information processing apparatus 10. FIG. 4A and FIG. 4B respectively illustrate a configuration example of a display screen for requesting a login process and a configuration example of information transmitted to a web server. The display screen illustrated in FIG. 4A is, for example, a web page to log in to an ABXYZ site, and illustrates entry forms for a user ID (mail address) and password of a user who logs in. In addition, the display screen illustrated in FIG. 4A also displays a login button for instructing execution of a login process.

The user who intends to log in to the ABXYZ site enters his or her own user ID (mail address) and the password that has been set for the ABXYZ site in advance into the respective entry forms and then presses the login button. When the login button is pressed on the display screen illustrated in FIG. 4A, the browser 11 transfers information illustrated in FIG. 4B to the network interface 7 through the login monitoring unit 12. The information illustrated in FIG. 4B is, for example, conformity with HTTP (Hyper Text Transfer Protocol), and includes the mail address (user ID) and the password, which have been entered through a web page, and the destination URL (POST method) to log in to the ABXYZ site.

When the login monitoring unit 12 acquires the information illustrated in FIG. 4B, the login monitoring unit 12 searches the URL column of the monitoring site DB 4a for the destination information (URL) included in the acquired information, and judges whether the destination web server is a web site contained in the monitoring site DB 4a. Because the information illustrated in FIG. 4B includes "login.abxyz-.com/login.srf" as the destination information, the login monitoring unit 12 judges that the destination web server is a web site contained in the monitoring site DB 4a. The login monitoring unit 12 specifies a form contained in the monitoring site DB 4a in association with the destination URL (here, specifies "login"), and judges whether the information transferred from the browser 11 includes information of the specified form (given information).

Because the information illustrated in FIG. 4B includes "login" form, the login monitoring unit 12 judges that the information transferred from the browser 11 includes the information of the specified form. Furthermore, the login monitoring unit 12, which can be used for extracting, extracts information (here, mail address) entered in association with the specified form (here, login form) from the information transferred from the browser 11. Note that, here, the login monitoring unit 12 extracts "father@abxyz.com".

The login monitoring unit 12, which can be used for specifying, searches the user IDs in the user DB 4b for the extracted mail address, and, when searching is successful, specifies the user on the basis of the corresponding user name. The login monitoring unit 12 reads the user name of the specified user from the user DB 4b and, for example, temporarily stores the user name in the RAM 3. The login monitoring unit 12, when searching the user DB 4b, may specify not only a user ID (mail address) but also the corresponding user name on the basis of site information of a web site specified on the basis of the monitoring site DB 4a. In addition, in specifying the user, a user may be specified when the extracted mail addresses are all accordant with the user IDs of the user DB 4b or a user may be specified when a portion of the extracted mail addresses are accordant with the user IDs of the user DB 4b.

When the login monitoring unit 12 fails to retrieve the extracted mail address from the user DB 4b, the login monitoring unit 12 extracts the character string of the extracted mail address on the left to "@" and temporarily stores the extracted character string, for example, in the RAM 3 as a user name. In addition, the login monitoring unit 12 enters the user name extracted from the mail address and the mail address into the user DB 4b in association with site information of a web site that is the destination of information from which the mail address is extracted. Thus, even when a user is not contained in the user DB 4b, when a web page for requesting a login process for a web site contained in the monitoring site DB 4a is transmitted, the user is entered into the user DB 4b as the user of the information processing apparatus 10.

Thus, when the users of the information processing apparatus 10 execute a login process on each web site to log in to the web site without entering user IDs (mail addresses) through the operating unit 5, the user ID of each user is automatically entered into the user DB 4b. Thus, convenience of each user may be improved.

When the network interface 7 has acquired information illustrated in FIG. 4B from the browser 11, the network interface 7 transmits information on the basis of URL included in the acquired information through a network to the corresponding web site, and requests execution of a login process. When the network interface 7 has transmitted information that requests execution of the login process illustrated in FIG. 4B, the network interface 7 receives information indicating the result of the login process (web page) from the destination web server.

When the network interface 7 has received information (web page) from the web server, the network interface 7 transfers the received web page to the browser 11 through the login monitoring unit 12. The browser 11 instructs the display unit 6 to display a display screen illustrated in FIG. 5 based on the acquired web page.

Figure 5A:
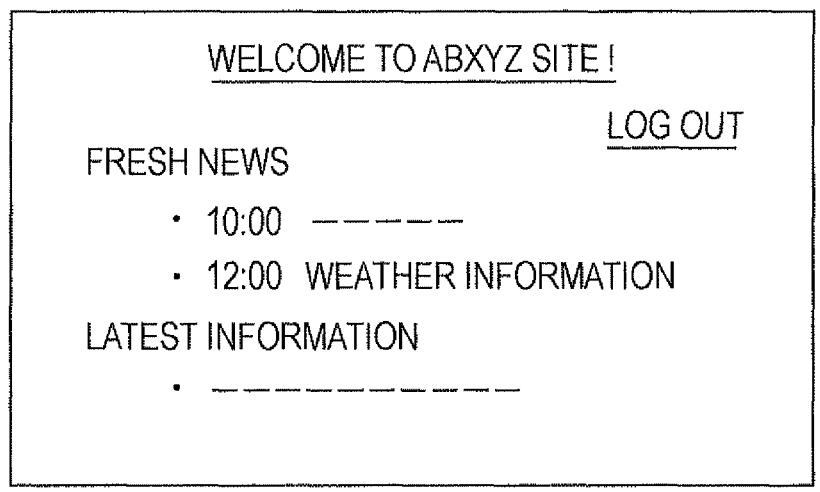
FIG. 5A and FIG. 5B illustrate exemplary display screens.
Figure 5B:
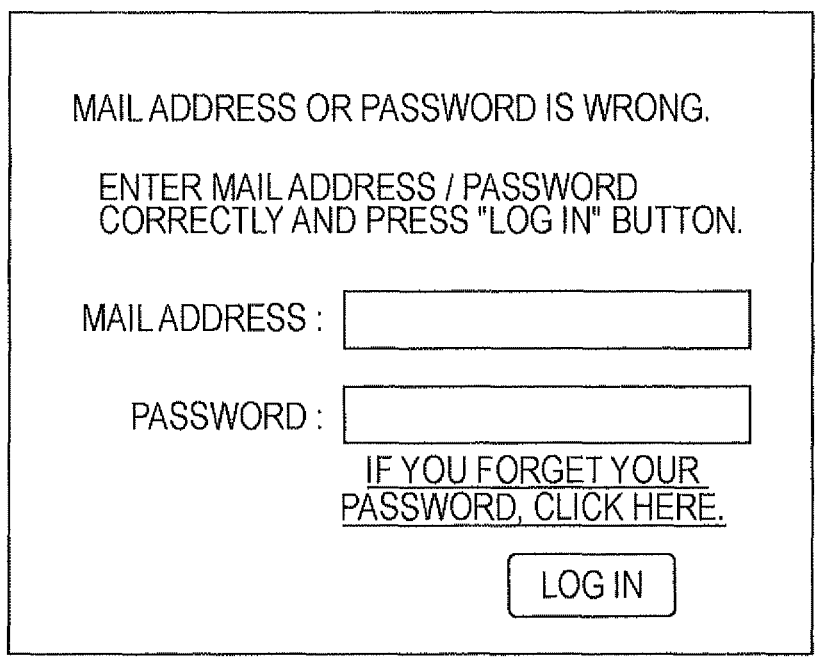

FIG. 5A and FIG. 5B illustrate examples of a display screen. Note that FIG. 5A illustrates a display screen based on a web page when the login process is successful, and FIG. 5B illustrates a display screen based on a web page when the login process ends in failure. When the browser 11 has received a web page for the case in which the login process is successful from the network interface 7, the browser 11 instructs the display unit 6 to display the display screen illustrated in FIG. 5A. The display screen based on the web page when the login process is successful displays information that indicates a login to the web site is successful (access is permitted) like "Welcome to ABXYZ site!" illustrated in FIG. 5A, a logout button for instructing execution of a logout process to the logged-in web site, and the like.

On the other hand, when the browser 11 has received the web page for the case in which the login process ends in failure from the network interface 7, the browser 11 instructs the display unit 6 to display the display screen illustrated in FIG. 5B. The display screen based on the web page when the login process ends in failure, as illustrated in FIG. 5B, displays again the entry forms for a user ID and password of the user who logs in and a login button for instructing execution of a login process, as well as the display screen illustrated in FIG. 4A.

Here, the login monitoring unit 12, when transferring information (web page) transferred from the network interface 7 to the browser 11, judges, based on the characteristic of the acquired web page, whether the login process is successful or ends in failure.

The characteristic of the web page when the login process is successful includes, as illustrated in FIG. 5A, buttons for instructing execution of the logout process, such as logout, logoff and sign-off or character strings of them. In addition, the characteristic of the web page, when the login process is successful, includes amount of information, and does not display again the entry forms for a user ID (mail address) and a password.

In addition, the characteristic of URL of the web page, when the login process is successful, differs from URL for requesting execution of the login process, and includes information that indicates that user authentication is successful, such as ok, authorized, and success, information that indicates a top page of a web site, such as home, index, top, or main.

On the other hand, the characteristic of the web page when the login process ends in failure, as illustrated in FIG. 5B, displays again the entry forms for a user ID (mail address) and a password. In addition, the characteristic of the web page when the login process ends in failure includes a message that indicates that the login has failed, such as "mail address or password is wrong", "login has failed", or the like. Furthermore, the characteristic of URL of the web page when the login process ends in failure includes information that indicates that user authentication has failed and requests user authentication again, such as error, NG, and retry.

Thus, the login monitoring unit 12 judges whether the information (web page) transferred from the network interface 7 includes, in the body of the page, a button for instructing execution of a logout process or a character string, whether the entry forms for a user ID (mail address) and a password are included again, whether a message that indicates that a login ends in failure is included, and the like. In addition, the login monitoring unit 12 judges whether the URL included in the information transferred from the network interface 7 includes information that indicates that user authentication (login process) is successful and whether the information that indicates that user authentication ends in failure and user authentication is requested again is included.

Thus, the login monitoring unit 12 judges, based on whether the web page and URL transferred from the network interface 7 include the characteristic when the login process is successful or the characteristic when the login process ends in failure, whether the login process is successful or ends in failure. These judgment criteria are set in the login monitoring unit 12. When the login monitoring unit 12 judges that the login process is successful, the login monitoring unit 12 notifies the setting switch unit 13 that the login process is successful.

When the setting switch unit 13 receives a notification that the login process is successful from the login monitoring unit 12, the setting switch unit 13 reads, from the RAM 3, a user name of the user who is specified by the login monitoring unit 12 on the basis of the information transferred from the browser 11 to the network interface 7. The setting switch unit 13 searches the user name column of the personal settings DB 4c for the read user name. When searching is successful, the setting switch unit 13 reads the corresponding personal setting information from the personal settings DB 4c. The setting switch unit 13 stores the read personal setting information in given portions of the RAM 3 to thereby construct an operating environment based on the personal setting information read from the personal settings DB 4c.

The setting switch unit 13 changes the settings of conversion software so as to be replaced with the user dictionary read from the personal settings DB 4c. In addition, the setting switch unit 13 switches a History folder so as to be replaced with the history information read from the personal settings DB 4c. Thus, as illustrated in FIG. 6A and FIG. 6B, based on a history of entry by each user, conversion to a word frequently used by the user becomes easy, and based on a history of web sites browsed by each user, it becomes easy to access web sites frequently browsed by the user. Thus, usability of users may be improved.

FIG. 6A and FIG. 6B respectively illustrate examples of conversion candidates generated by a Kana-Kanji conversion process. All words and letters in FIGS. 6A and 6B are Kana-Kanji characters or emoticons available in Japan that are able to be input by the same operation (hitting keys "b", "a", "i", "b", "a", "i") and that have different meaning. FIG. 6A illustrates conversion candidates that are good for grown-ups to do formal conversations. (−1: a phonogram expression using Japanese Kata-Kana character set for the pronunciation near "bye-bye", 2: "selling and buying", 3: "double and double", 4: "double and double" (different expression from 3), 5: another phonogram expression using Japanese Hira-Kana character set) FIG. 6B illustrates good conversion candidates for casual chatting as children often do. (−1 to 9: expressions that mean "good-bye"). As described above, when the personal settings information is switched by the setting switch unit 13, the operating environment based on the personal setting information is switched. Thus, for example, conversion candidates generated on the basis of the user dictionary at the time of Kana-Kanji conversion process are changed. For example, FIG. 6A illustrates conversion candidates when the user dictionary of a user whose user name is "father", and FIG. 6B illustrates conversion candidates when the user dictionary of a user whose user name is "sister".

In this way, the setting switch unit 13 selectively uses the personal setting information of each user. Thus, without executing the login process and the logout process on the information processing apparatus 10 as when the existing art, the setting switch unit 13 is able to provide an operating environment based on setting information corresponding to the user who is currently using the information processing apparatus 10. In addition, even in a simple apparatus that is not able to switch an environment for each user through a login process and a logout process, it is possible to provide an operating environment based on setting information corresponding to the user who is currently using the information processing apparatus 10. Thus, it is possible to customize environments corresponding to the respective users.

When the setting switch unit 13 fails to retrieve the user name read from the RAM 3 from the user name column of the personal settings DB 4c, that is, the personal setting information corresponding to the user of the read user name is not contained in the personal settings DB 4c, the setting switch unit 13 reads default setting information stored in the HDD 4. The setting switch unit 13 copies the default setting information read from the HDD 4 to a file of a file name based on the user name read from the RAM 3. Note that a file name assigned to setting information includes a user name and an extension that indicates that a file is a dictionary file or a history file, like "username.dic", "username.history", or the like.

In addition, the setting switch unit 13 enters the file name of the file, into which the default setting information is copied as described above, in the personal settings DB 4c in association with the user name read from the RAM 3. Furthermore, the setting switch unit 13 reads the file name contained in the personal settings DB 4c as described above and stores the file name in given portions of the RAM 3 to thereby construct an operating environment based on the personal setting information.

In this way, even when a user is not contained in the personal settings DB 4c, when a login process for a web site contained in the monitoring site DB 4a is successful, the personal setting information of that user is newly entered into the personal settings DB 4c as the user of the information processing apparatus 10. Thus, the user of the information processing apparatus 10 is automatically entered when a login process for the web site contained in the monitoring site DB 4a is successful without entering setting information for generating his or her own preferred operating environment through the operating unit 5, so convenience of each user may be improved.

Hereinafter, a process of switching an operating environment when the information processing apparatus 10 according to the first exemplary embodiment switches setting information corresponding to a user will be described with reference to an operation chart. FIG. 7 and FIG. 8 are an operation chart that illustrates operations of a process of switching an operating environment. The following process is executed by the control unit 1 in accordance with a control program stored in the ROM 2 or HDD 4 of the information processing apparatus 10.

When the user of the information processing apparatus 10 instructs execution of the browser through the operating unit 5, the control unit 1 reads the browser stored in the HDD 4 onto the RAM 3 and executes the browser to thereby launch the browser (operation S1). The control unit 1 (browser 11) judges whether the user has operated the operating unit 5 to instruct execution of a process of transmitting information to a web server (operation S2). When it is judged that execution of the transmission process is not instructed (operation S2: NO), the control unit 1 waits until the instruction is issued.

When it is judged that execution of a process of transmitting information to a web server is instructed (operation S2: YES), the control unit 1 (login monitoring unit 12) judges whether the destination URL is contained in the monitoring site DB 4a (operation S3). When it is judged that the destination URL is not contained in the monitoring site DB 4a (operation S3: NO), the control unit 1 executes the transmission process of which execution is instructed in operation S2 (operation S4).

In addition, the control unit 1 judges whether information is received from the web server in reply to the information transmitted in the transmission process executed in operation S4 (operation S5). When it is judged that the information is not received from the web server (operation S5: NO), the control unit 1 waits until the information is received from the web server while performing other regular operations. When the control unit 1 judges that the information is received from the web server (operation S5: YES), the control unit 1 transfers the received web page to the display unit 6 for display (operation S19).

When it is judged that the destination URL is contained in the monitoring site DB 4*a* (operation S3: YES), the control unit 1 extracts a user ID from the information to be transmitted to the web server indicated by the destination URL (operation S6). The control unit 1 extracts the information (mail address), entered in correspondence with the form (login form) contained in the monitoring site DB 4*a*, from the information to be transmitted to the web server. The control unit 1 executes the transmission process of which execution is instructed in operation S2 (operation S7).

The control unit 1 (login monitoring unit 12) searches the user DB 4*b* for the user ID extracted in operation S6, and judges whether the extracted user ID is contained in the user DB 4*b* (operation S8). When it is judged that the user ID is contained in the user DB 4*b* (operation S8: YES), that is, when the extracted user ID is retrieved from the user DB 4*b*, the control unit 1 reads the user name corresponding to the user ID from the user DB 4*b* and temporarily stores the user name in the RAM 3 (operation S9).

When it is judged that the user ID extracted in operation S6 is not contained in the user DB 4*b* (operation S8: NO), that is, when the extracted user ID is not retrieved from the user DB 4*b*, the control unit 1 extracts the user name from the extracted user ID and temporarily stores the user name in the RAM 3 (operation S10). In addition, the control unit 1 enters the extracted user name and the user ID extracted in operation S6 in the user DB 4*b* in association with site information of the destination web site of the transmission process executed in operation S7 (operation S11).

The control unit 1 judges whether the information is received from the web server in reply to the information transmitted in the transmission process executed in operation S7 (operation S12). When it is judged that the information is not received from the web server (operation S12: NO), the control unit 1 waits until the information is received from the web server while performing other regular operations. When it is judged that the information is received from the web server (operation S12: YES), the control unit 1 (login monitoring unit 12) judges, based on the characteristic of the web page received from the web server, whether the login process that is requested on the basis of the information transmitted in operation S7 is successful or ends in failure (operation S13).

When the control unit 1 judges that the login process ends in failure (operation S13: NO), the control unit 1 proceeds with the process to operation S19 and transfers the received web page to the display unit 6 for display (operation S19). When it is judged that the login process is successful (operation 513: YES), the control unit 1 (setting switch unit 13) reads the user name stored in the RAM 3 in operation S9 or operation S10 and searches the personal settings DB 4*c* for the read user name. Thus, the control unit 1 judges whether the read user name is contained in the personal settings DB 4*c* (operation S14).

When the control unit 1 judges that the user name is contained in the personal settings DB 4*c* (operation S14: YES), that is, when the read user name is retrieved from the personal settings DB 4*c*, the control unit 1 reads the personal setting information corresponding to the user name from the personal settings DB 4*c* (operation S15). The control unit 1 stores the read personal setting information in given portions of the RAM 3 to thereby set an operating environment based on the personal setting information read from the personal settings DB 4*c* (operation S16).

When it is judged that the user name is not contained in the personal settings DB 4*c* (operation S14: NO), that is, when the read user name is not retrieved from the personal settings DB 4*c*, the control unit 1 reads the user name stored in the RAM 3 in operation S9 or operation S10, and copies default setting information stored in the HDD 4 to a file of a file name based on the user name read from the RAM 3 (operation S17). The control unit 1 enters the user name read from the RAM 3 and the file name of the file, into which the default setting information is copied, in association with each other in the personal settings DB 4*c* (operation S18).

The control unit 1 (setting switch unit 13) reads the personal setting information corresponding to the user name read from the RAM 3 from the personal settings DB 4*c* entered in operation 518 (operation S15), and stores the read personal setting information in given portions of the RAM 3 to thereby set an operating environment based on the personal setting information read from the personal settings DB 4*c* (operation S16).

The control unit 1 transfers the web page received from the web server in operation 12 to the display unit 6 for display (operation S19). The control unit 1 judges whether the user of the information processing apparatus 10 has operated the operating unit 5 to instruct exit from the browser (operation S20). When it is judged that exit from the browser is instructed (operation S20: YES), the control unit 1 ends execution of the browser to exit from the browser (operation S21). When it is judged that exit from the browser is not instructed (operation S20: NO), the control unit 1 returns the process to operation S2 and repeats the process of the operations S2 to S21.

Through the process, the information processing apparatus 10 is able to specify a current user on the basis of information transmitted to a web server when a login process to a web site is performed and provide an operating environment on the basis of personal settings corresponding to the specified user. Thus, each user who shares the information processing apparatus 10 is able to switch to his or her own operating environment by performing a normal login process to a web site and, in addition, is able to customize his or her own operating environment. Thus, each user does not perform a login process or a logout process to the information processing apparatus 10 and does not need to be aware of a switching process to personal settings as when these processes.

In addition, because the login process and logout process to the information processing apparatus 10 are not performed, it is not necessary to enter an account and a password that are necessary for the login process to the information processing apparatus 10. Then, latency based on execution time of the login process and logout process is reduced and, therefore, user convenience may be improved particularly at the time of switching a user. The above configuration may also be applied to a simple apparatus that is not able to switch an environment for each user through a login process and a logout process and, therefore, user convenience may be improved even in the above simple apparatus.

Furthermore, in the first exemplary embodiment, the information processing apparatus 10 switches to an operating environment corresponding to a user (logged-in user) who is currently using only when the login process to the web site is successful. In recent years, a large number of web sites, such as various search sites or portal sites, require user authentication (login process). It is possible to provide an appropriate operating environment to a user who is authenticated as a valid user by such an external web server, and it is possible to prevent others from using valid user's environment by, for example, spoofing. Thus, it is possible to securely switch the operating environment.

In addition, in the first exemplary embodiment, the information processing apparatus 10, when transmitting information to URL contained in the monitoring site DB 4*a*, judges whether the transmitted information includes a form contained in the monitoring site DB 4a. Thus, in comparison with the case in which judgment is made on all pieces of information transmitted to all external devices, it is possible to effectively execute the judgment process.

Hereinafter, an information processing apparatus according to the invention will be described in greater detail with reference to the accompanying drawings that illustrate a second embodiment. The information processing apparatus according to the second embodiment has components similar to those of the information processing apparatus 10 according to the first exemplary embodiment. Like reference numerals denote like components, and the description thereof is omitted.

The information processing apparatus 10 of the first exemplary embodiment, when transmitting information to a web server (web site), specifies a user by extracting a user ID from the information transmitted to the web site only when the URL of the destination web site is set in the monitoring site DB 4a in advance.

Likewise, the information processing apparatus 10 of the second embodiment, when transmitting information to a web server (web site), specifies a user on the basis of the information transmitted to the web site only when the URL of the destination web site is set in the monitoring site DB 4a in advance. In addition, the information processing apparatus 10 of the second embodiment specifies a user from the information transmitted to the web site even when the URL of the destination web site is not set in the monitoring site DB 4a in advance but when the information transmitted to the web site includes a user ID that can specify the user.

Hereinafter, in the information processing apparatus 10 according to the second embodiment, various functions implemented in such a manner that the control unit 1 executes control programs stored in the ROM 2 or the HDD 4 will be described. Note that in the second embodiment as well, the control unit 1 implements various functions, such as the browser 11, the login monitoring unit 12 and the setting switch unit 13, and the processes performed by the browser 11 and setting switch unit 13 are similar to the processes described in the first exemplary embodiment.

In the information processing apparatus 10 of the second embodiment, as when the login monitoring unit 12 of the first exemplary embodiment, the login monitoring unit 12, when information is transferred from the browser 11 and is the information transmitted to the web site of the URL contained in the monitoring site DB 4a, extracts information (here, user ID) entered into a form (here, login form) that is contained in the monitoring site DB 4a from the transferred information. In addition, the login monitoring unit 12 specifies a user from the extracted user ID in advance. When the login process based on the information transmitted to the web site is successful, the setting switch unit 13 sets an operating environment based on the personal setting information corresponding to the user specified by the login monitoring unit 12.

Here, in the information processing apparatus 10 of the second embodiment, the login monitoring unit 12, even when the destination URL of the information transferred from the browser 11 is not contained in the monitoring site DB 4a, judges whether the transferred information includes a given form (here, login form). When the login monitoring unit 12 judges that the transferred information includes the given form, the login monitoring unit 12 enters the destination URL of the information transferred from the browser 11, site information of the web site of the URL, and a form name of the given form, in association with one another into the monitoring site DB 4a. The information of the given form is set in the ROM 2 in advance.

In addition, as in the case in which the URL of the information transferred from the browser 11 is contained in the monitoring site DB 4a, the login monitoring unit 12 extracts information, which is entered into the form contained in the monitoring site DB 4a, from the information transferred from the browser 11 and specifies a user from the extracted user ID. Furthermore, when the login process based on the information transmitted to the web site is successful, the setting switch unit 13 sets an operating environment based on the personal setting information corresponding to the user specified by the login monitoring unit 12.

The process in which the login monitoring unit 12 newly enters the user name of the user specified on the basis of the information transferred from the browser 11 into the user DB 4b, the process in which the login monitoring unit 12 determines, based on the web page received from the web server, whether the login process is successful, the process in which the login monitoring unit 12 newly enters the personal setting information corresponding to the user into the user DB 4b, and the like, are similar to the processes described in the first exemplary embodiment.

Figure 10:
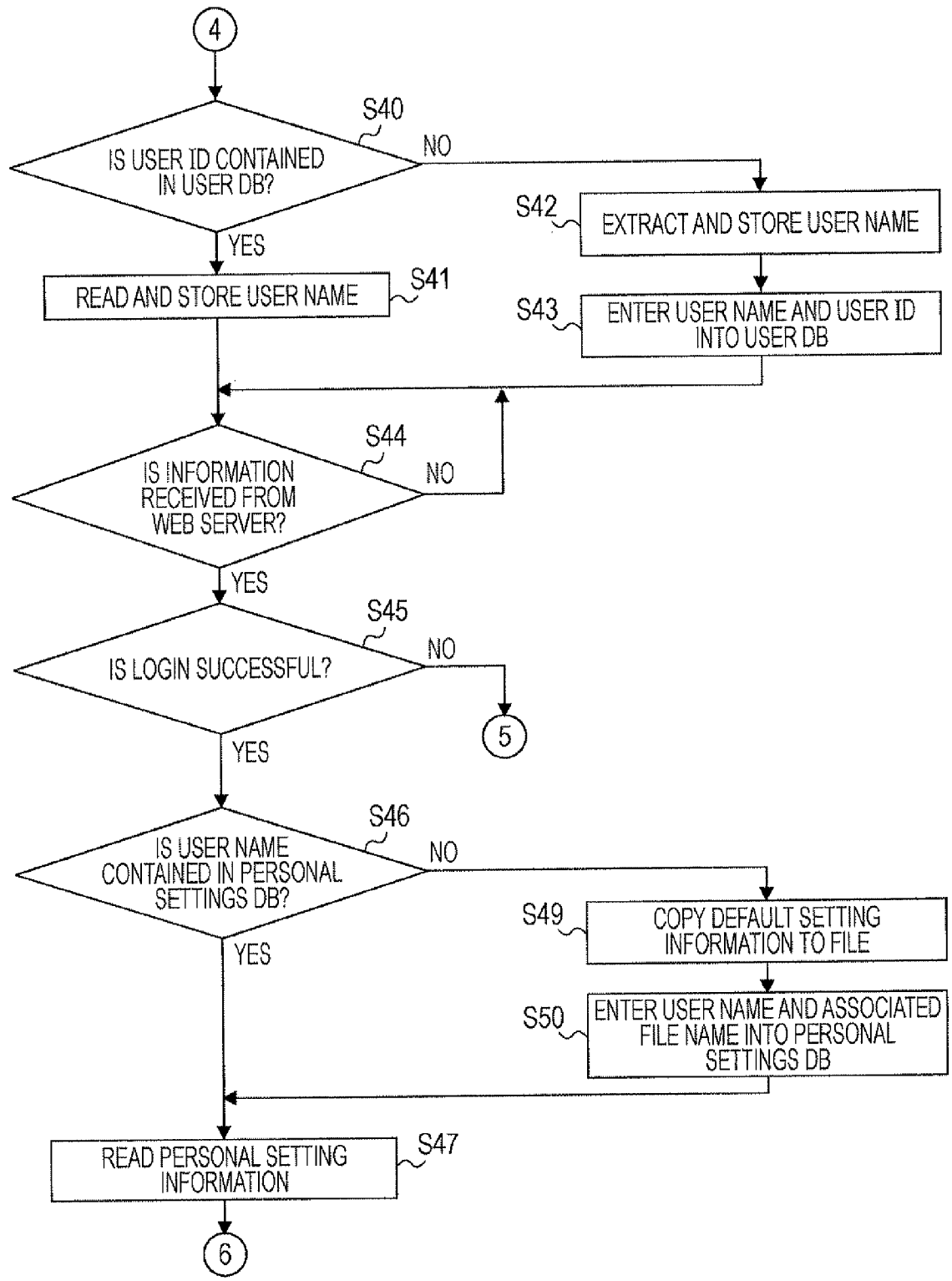
FIG. 10 illustrates exemplary operations of a process switching an operating environment.
Figure 11:
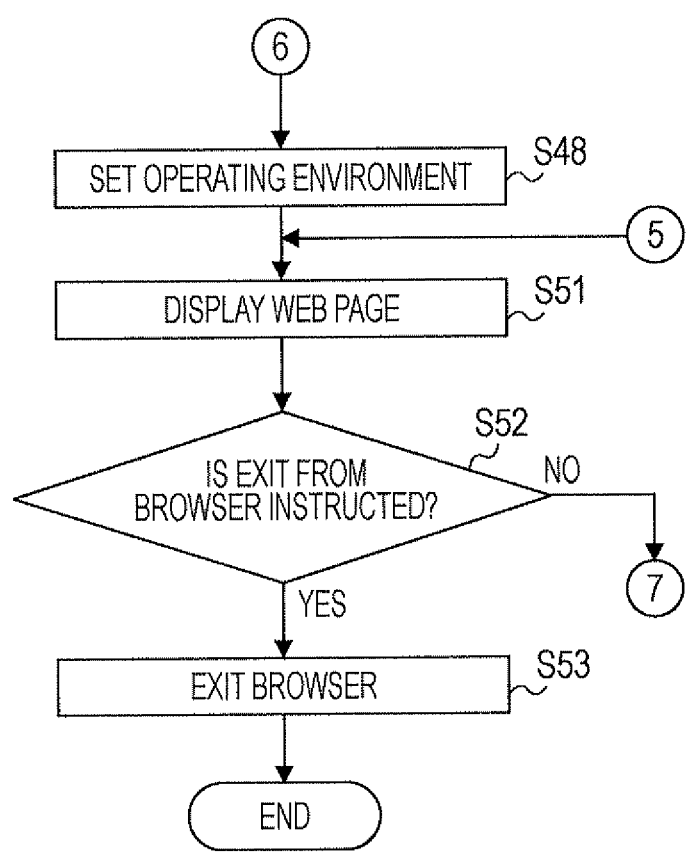
FIG. 11 illustrates exemplary operations of a process switching an operating environment.

Hereinafter, a process of switching an operating environment when the information processing apparatus 10 according to the second embodiment switches setting information corresponding to a user will be described with reference to an operation chart. FIG. 9 to FIG. 11 are an operation chart that illustrates operations of a process of switching an operating environment. The following process is executed by the control unit 1 in accordance with a control program stored in the ROM 2 or HDD 4 of the information processing apparatus 10.

When the user of the information processing apparatus 10 instructs execution of the browser through the operating unit 5, the control unit 1 reads the browser stored in the HDD 4 onto the RAM 3 and executes the browser to thereby launch the browser (operation S31). The control unit 1 (browser 11) judges whether the user operates the operating unit 5 to instruct execution of a process of transmitting information to a web server (operation S32). When it is judged that execution of the transmission process is not instructed (operation S32: NO), the control unit 1 waits until the instruction is issued.

When it is judged that execution of a process of transmitting information to a web server is instructed (operation S32: YES), the control unit 1 (login monitoring unit 12) judges whether the destination URL is contained in the monitoring site DB 4a (operation S33). When it is judged that the destination URL is not contained in the monitoring site DB 4a (operation S33: NO), the control unit 1 judges whether the information to be transmitted to the web server includes a given form (operation S34). When it is judged that the information to be transmitted to the web server includes the given form (operation S34: YES), the control unit 1 enters the destination URL, of the transmission process of which execution is instructed in operation S32, into the monitoring site DB 4a (operation S35) and then proceeds with the process to operation S38.

When the control unit 1 judges that the information to be transmitted to the web server does not include a given form (operation S34: NO), the control unit 1 executes the transmission process instructed in operation S32 (operation S36). In addition, the control unit 1 judges whether information is received from the web server in reply to the information transmitted in the transmission process executed in operation S36 (operation S37). When it is judged that the information is not received from the web server (operation S37: NO), the control unit 1 waits until the information is received from the web server while performing other regular operations. When the control unit 1 judges that the information is received from the web server (operation S37: YES), the control unit 1 transfers the received web page to the display unit 6 for display (operation S51).

When it is judged that the destination URL is contained in the monitoring site DB 4a (operation S33: YES), the control unit 1 extracts a user ID from the information to be transmitted to the web server indicated by the destination URL (operation S38). The control unit 1 extracts the information (mail address), entered in correspondence with the form (login form) contained in the monitoring site DB 4a, from the information to be transmitted to the web server. The control unit 1 executes the transmission process instructed in operation S32 (operation S39).

The control unit 1 (login monitoring unit 12) searches the user DB 4b for the user ID extracted in operation S38, and judges whether the extracted user ID is contained in the user DB 4b (operation S40). When it is judged that the user ID is contained in the user DB 4b (operation S40: YES), the control unit 1 reads the user name corresponding to the user ID from the user DB 4b and temporarily stores the user name in the RAM 3 (operation S41).

When it is judged that the user ID extracted in operation S38 is not contained in the user DB 4b (operation S40: NO), the control unit 1 extracts the user name from the extracted user ID and temporarily stores the user name in the RAM 3 (operation S42). In addition, the control unit 1 enters the extracted user name and the user ID extracted in operation S38 into the user DB 4b in association with site information of the destination web site of the transmission process executed in operation S39 (operation S43).

The control unit 1 judges whether the information is received from the web server in reply to the information transmitted in the transmission process executed in operation S39 (operation S44). When it is judged that the information is not received from the web server (operation S44: NO), the control unit 1 waits until the information is received from the web server while performing other regular operations. When it is judged that the information is received from the web server (operation S44: YES), the control unit 1 (login monitoring unit 12) judges, based on the characteristic of the web page received from the web server whether the login process that is requested on the basis of the information transmitted in operation S39 is successful or ends in failure (operation S45).

When the control unit 1 judges that the login process ends in failure (operation S45: NO), the control unit 1 proceeds with the process to operation S51 and transfers the received web page to the display unit 6 for display (operation S51). When it is judged that the login process is successful (operation S45: YES), the control unit 1 (setting switch unit 13) reads the user name stored in the RAM 3 in operation S41 or operation S42 and searches the personal settings DB 4c for the read user name. Thus, the control unit 1 judges whether the read user name is contained in the personal settings DB 4c (operation S46).

When it is judged that the user name is contained in the personal settings DB 4c (operation S46: YES), the control unit 1 reads the personal setting information corresponding to the user name from the personal settings DB 4c (operation S47), and stores the read personal setting information in given portions of the RAM 3 to thereby set an operating environment based on the personal setting information read from the personal settings DB 4c (operation S48).

When it is judged that the user name is not contained in the personal settings DB 4c (operation S46: NO), the control unit 1 reads the user name stored in the RAM 3 in operation S41 or operation S42, and copies default setting information stored in the HDD 4 to a file of a file name based on the user name read from the RAM 3 (operation S49). The control unit 1 enters the user name read from the RAM 3 and the file name of the file, into which the default setting information is copied, in association with each other into the personal settings DB 4c (operation S50).

The control unit 1 (setting switch unit 13) reads the personal setting information, corresponding to the user name read from the RAM 3, from the personal settings DB 4c entered in operation S50 (operation S47), and stores the read personal setting information in given portions of the RAM 3 to thereby set an operating environment based on the personal setting information read from the personal settings DB 4c (operation S48).

The control unit 1 transfers the web page, received from the web server in operation 44, to the display unit 6 for display (operation S51). The control unit 1 judges whether the user of the information processing apparatus 10 operates the operating unit 5 to instruct an exit from the browser (operation S52). When it is judged that the exit from the browser is instructed (operation S52: YES), the control unit 1 ends execution of the browser to exit from the browser (operation S53). When it is judged that exit from the browser is not instructed (operation S52: NO), the control unit 1 returns the process to operation S32 and repeats the process of the operations S32 to S53.

Through the process, the information processing apparatus 10 of the second embodiment, even when requesting a login process to a web site that is not contained in the monitoring site DB 4a, is able to specify a user who is currently using the information processing apparatus 10 on the basis of the information transmitted to the web site. The information processing apparatus 10 provides an operating environment on the basis of personal settings corresponding to the specified user. In addition, by entering such a web site into the monitoring site DB 4a, it is possible to add a monitoring target when a transmission process is performed next time.

Hereinafter, an information processing apparatus according to the invention will be described in greater detail with reference to the accompanying drawings that illustrate a third embodiment. The information processing apparatus according to the third embodiment has components similar to those of the information processing apparatus 10 according to the first exemplary embodiment. Like reference numerals denote like components, and the description thereof is omitted.

When information for requesting execution of a login process to a web site on a web server is transmitted, the information processing apparatus 10 of the first exemplary embodiment or second embodiment specifies a user in advance by extracting a user ID from the information transmitted to the web server. The information processing apparatus 10 of the first exemplary embodiment or second embodiment judges, based on the characteristic of a web page returned from the web server, whether the login process is successful. The information processing apparatus 10 of the first exemplary embodiment or second embodiment switches to an operating environment corresponding to the user only when the login process is successful.

When information for requesting execution of a login process to a web server (web site) is transmitted, the information processing apparatus 10 of the third embodiment specifies a user by extracting a user ID from the information to be transmitted to the web server. The information processing apparatus 10 of the third embodiment switches to an operating environment corresponding to the specified user. That is, the information processing apparatus 10 of the third embodiment, irrespective of whether the login process to the web server is successful, switches to an operating environment corresponding to a user that requests the login process each time the login process to the web server is requested.

Hereinafter, in the information processing apparatus 10 according to the third embodiment, various functions implemented in such a manner that the control unit 1 executes control programs stored in the ROM 2 or the HDD 4 will be described. Note that in the third embodiment, the control unit 1 implements such various functions as the browser 11, the login monitoring unit 12 and the setting switch unit 13. The processes performed by the browser 11 and setting switch unit 13 are similar to the processes described in the first exemplary embodiment.

The login monitoring unit 12 in the information processing apparatus 10 of the third embodiment is similar to the login monitoring unit 12 of the first exemplary embodiment. The login monitoring unit 12 in the information processing apparatus 10 of the third embodiment extracts information (here, user ID) entered into a form (here, login form) that is contained in the monitoring site DB 4a from the transferred information after information is transferred from the browser 11 and is information transmitted to the web site of the URL contained in the monitoring site DB 4a. The login monitoring unit 12 specifies a user from the extracted user ID.

Here, in the information processing apparatus 10 of the third embodiment, the setting switch unit 13 sets an operating environment based on the personal setting information corresponding to the user specified by the login monitoring unit 12, in spite of whether the login process based on the information transmitted to the web site is successful.

The process, in which the login monitoring unit 12 newly enters the user name of the user specified on the basis of the information transferred from the browser 11 into the user DB 4b, the process, in which the login monitoring unit 12 newly enters the personal setting information corresponding to the user into the user DB 4b, and the like processes are similar to the processes described in the first exemplary embodiment.

Figure 12:
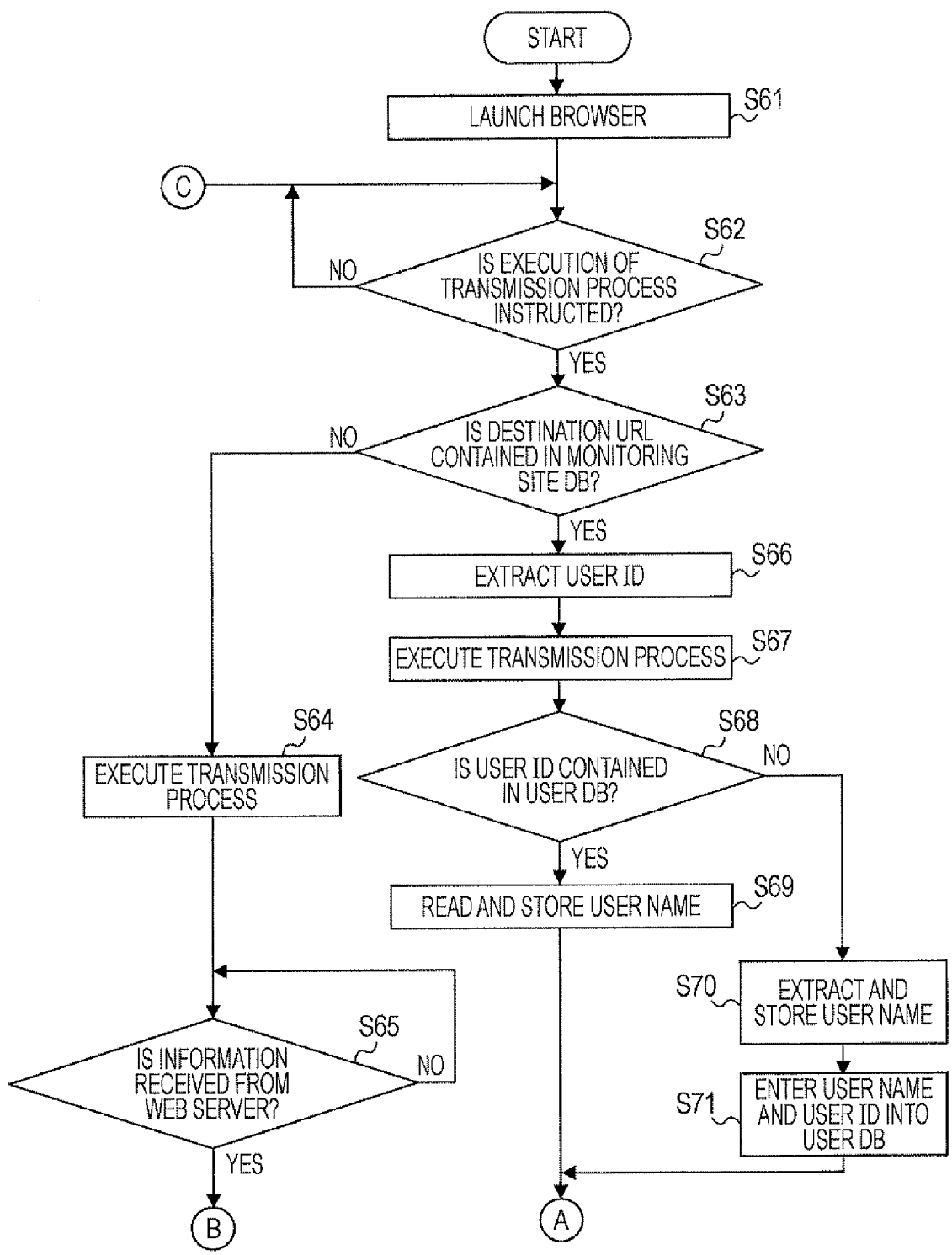
FIG. 12 illustrates exemplary operations of a process switching an operating environment.
Figure 13:
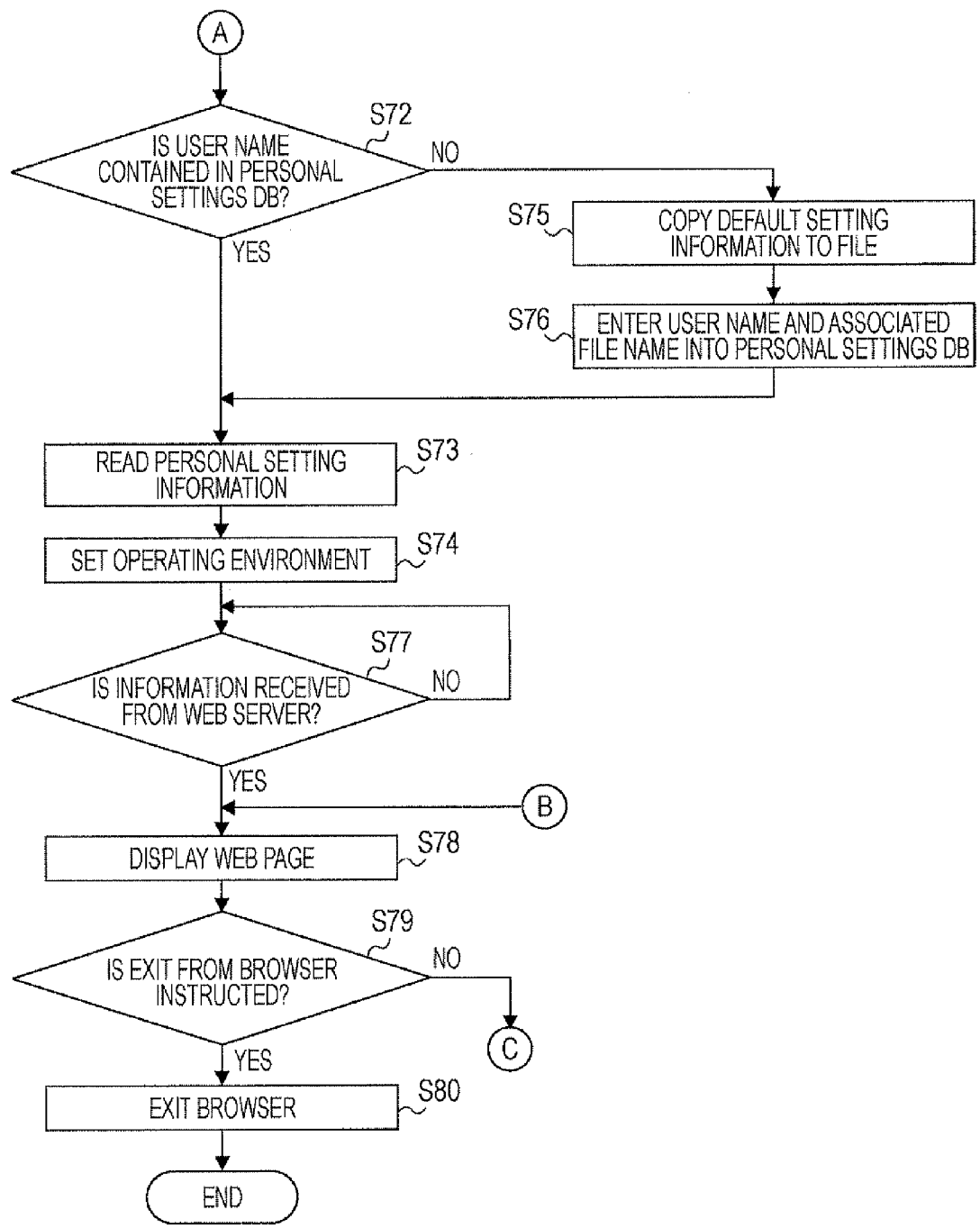
FIG. 13 illustrates exemplary operations of a process switching an operating environment.

Hereinafter, a process of switching an operating environment when the information processing apparatus 10 according to the third embodiment switches setting information corresponding to a user will be described with reference to an operation chart. FIG. 12 and FIG. 13 are an operation chart that illustrates operations of a process of switching an operating environment. The following process is executed by the control unit 1 in accordance with a control program stored in the ROM 2 or HDD 4 of the information processing apparatus 10.

When the user of the information processing apparatus 10 instructs execution of the browser through the operating unit 5, the control unit 1 reads the browser stored in the HDD 4 onto the RAM 3 and executes the browser to thereby launch the browser (operation S61). The control unit 1 (browser 11) judges whether the user operates the operating unit 5 to instruct execution of a process of transmitting information to a web server (operation S62). When it is judged that execution of the transmission process is not instructed (operation S62: NO), the control unit 1 waits until the instruction is issued.

When it is judged that execution of a process of transmitting information to a web server is instructed (operation S62: YES), the control unit 1 (login monitoring unit 12) judges whether the destination URL is contained in the monitoring site DB 4a (operation S63). When it is judged that the destination URL is not contained in the monitoring site DB 4a (operation S63: NO), the control unit 1 executes the transmission process of which execution is instructed in operation S62 (operation S64).

In addition, the control unit 1 judges whether information is received from the web server in reply to the information transmitted in the transmission process executed in operation S64 (operation S65). When it is judged that the information is not received from the web server (operation S65: NO), the control unit 1 waits until the information is received from the web server while performing other regular operations. When the control unit 1 judges that the information is received from the web server (operation S65: YES), the control unit 1 transfers the received web page to the display unit 6 for display (operation S78).

When it is judged that the destination URL is contained in the monitoring site DB 4a (operation S63: YES), the control unit 1 extracts a user ID from the information to be transmitted to the web server indicated by the destination URL (operation S66). The control unit 1 extracts the information (mail address) entered in correspondence with the form (login form) contained in the monitoring site DB 4a, from the information to be transmitted to the web server. The control unit 1 executes the transmission process of which execution is instructed in operation S62 (operation S67).

The control unit 1 (login monitoring unit 12) searches the user DB 4b for the user ID extracted in operation S66, and judges whether the extracted user ID is contained in the user DB 4b (operation S68). When it is judged that the user ID is contained in the user DB 4b (operation S68: YES), the control unit 1 reads the user name corresponding to the user ID from the user DB 4b and temporarily stores the user name in the RAM 3 (operation S69).

When it is judged that the user ID extracted in operation S66 is not contained in the user DB 4b (operation S68: NO), the control unit 1 extracts the user name from the extracted user ID and temporarily stores the user name in the RAM 3 (operation S70). In addition, the control unit 1 enters the extracted user name and the user ID extracted in operation S66 into the user DB 4b in association with site information of the destination web site of the transmission process executed in operation S67 (operation S71).

The control unit 1 (setting switch unit 13) reads the user name stored in the RAM 3 in operation S69 or operation S70 and searches the personal settings DB 4c for the read user name. Thus, the control unit 1 judges whether the read user name is contained in the personal settings DB 4c (operation S72). When it is judged that the user name is contained in the personal settings DB 4c (operation S72: YES), the control unit 1 reads the personal setting information corresponding to the user name from the personal settings DB 4c (operation S73). The control unit 1 stores the read personal setting information in given portions of the RAM 3 to thereby set an operating environment based on the personal setting information read from the personal settings DB 4c (operation S74).

When it is judged that the user name is not contained in the personal settings DB 4c (operation S72: NO), the control unit 1 reads the user name stored in the RAM 3 in operation S69 or operation S70. The control unit 1 copies default setting information stored in the HDD 4 to a file of a file name based on the user name read from the RAM 3 (operation S75). The control unit 1 enters the user name read from the RAM 3 and the file name of the file, into which the default setting information is copied, in association with each other into the personal settings DB 4c (operation S76).

The control unit 1 (setting switch unit 13) reads the personal setting information, corresponding to the user name read from the RAM 3, from the personal settings DB 4c entered in operation S76 (operation S73). The control unit 1 stores the read personal setting information in given portions of the RAM 3 to thereby set an operating environment based on the personal setting information read from the personal settings DB 4c (operation S74).

The control unit 1 judges whether information is received from the web server in reply to the information transmitted in the transmission process executed in operation S67 (operation S77). When it is judged that the information is not received from the web server (operation S77: NO), the control unit 1 waits until the information is received from the web server while performing other regular operations. When the control unit 1 judges that the information is received from the web server (operation S77: YES), the control unit 1 transfers the received web page to the display unit 6 for display (operation S78).

The control unit 1 judges whether the user of the information processing apparatus 10 operates the operating unit 5 to instruct exit from the browser (operation S79). When it is judged that exit from the browser is instructed (operation S79: YES), the control unit 1 ends execution of the browser to exit from the browser (operation S80). When it is judged that exit from the browser is not instructed (operation S79: NO), the control unit 1 returns the process to operation S62 and repeats the process of the operations 562 to S80.

Through the process, in spite of whether the login process to the web site is successful, the information processing apparatus 10 of the third embodiment is able to specify a user who is currently using the information processing apparatus 10 on the basis of the information transmitted to the web site. The information processing apparatus 10 of the third embodiment provides an operating environment on the basis of personal settings corresponding to the specified user. Note that this configuration decreases in security level as compared with the configuration in which an operating environment is switched only when the login process to the web site is successful as when the information processing apparatus 10 according to the first exemplary embodiment or the second embodiment. However, for example, it may be sufficient when the information processing apparatus 10 is shared at home with family members. In addition, the information processing apparatus 10 of the third embodiment does not judge whether the login process is successful, so the process is simpler than that of the first exemplary embodiment or second embodiment and is easier in implementation than that of the first exemplary embodiment or second embodiment.

The information processing apparatus 10 of the third embodiment may be configured as in the information processing apparatus 10 according to the first or second embodiments. That is, even when information is transmitted to a web site that is not contained in the monitoring site DB 4a, the information processing apparatus 10 may be configured to specify a user who is currently using the processing apparatus 10 on the basis of the information to be transmitted. The information processing apparatus 10 may provide an operating environment based on the personal settings corresponding to the specified user irrespective of whether the login process is successful.

The information processing apparatus according to the second embodiment has components similar to those of the information processing apparatus 10 according to the first exemplary embodiment. Like reference numerals denote like components, and the description thereof is omitted. Note that in the information processing apparatus 10 of the fourth exemplary embodiment, the contents of the user DB 4b stored in the HDD 4 are as illustrated in FIG. 14.

The information processing apparatus 10 according to any of the first to third embodiments can use a mail address as a user ID when a login process to a web site is performed. Character string of the mail address on the left to "@" is utilized as a user name when entered into the user DB 4b or into the personal settings DB 4c. Thus, if one and the same user uses mail addresses having different character strings on the left to "@", they are handled as different users. Thus, when a single user performs a login process using different mail addresses for different web sites, it is possible to switch operating environments based on different personal settings each time the user logs in to the respective web sites. Thus, it is possible to use different personal settings for respective web sites.

However, when the information processing device 10 is configured as described above, even for the same user, information that is customized under the operating environment based on the personal settings corresponding to a different mail address is not incorporated in the operating environment corresponding to the other mail address. Thus, learning effect spreads. The information processing apparatus 10 of the fourth exemplary embodiment is configured so that if the same user uses different mail addresses, the different mail addresses are handled as one user.

FIG. 14 illustrates contents of the user DB. As illustrated in FIG. 14, the user DB 4b of the fourth exemplary embodiment contains site information for identifying web sites. In association with user names (for example, "father" or "sister") specified by the users of the information processing apparatus 10, user IDs (mail addresses) that are used when the users access respective web sites. The contents of the user DB 4b are entered by the control unit 1 every time each user of the information processing apparatus 10 enters his or her own user ID through the operating unit 5. In addition, the contents of the user DB 4b are, if necessary, entered by the control unit 1 when the control unit 1 executes the login monitoring process program stored in the HDD 4.

Note that in the fourth embodiment, even when user IDs have different character strings of the user IDs (mail addresses) on the left to "@" for accessing respective web sites, the user IDs are handled so that they are used by the user (same user) of the user name specified by each user. Thus, in the user DB 4b illustrated in FIG. 14, "father@abxyz.com", "father@zabc.co.jp", "john@opqopq.co.jp" and "njohn@mnmn.co.jp" are user IDs having different character strings on the left to "@". However, all are used by the user whose user name is "father". In addition, "sister@abxyz.com", "sister@zabc.co.jp", "nmary@opqopq.co.jp" and "mary@mnmn.co.jp" are user IDs having different character strings on the left to "@". However, all are used by the user whose user name is "sister".

Figure 15:
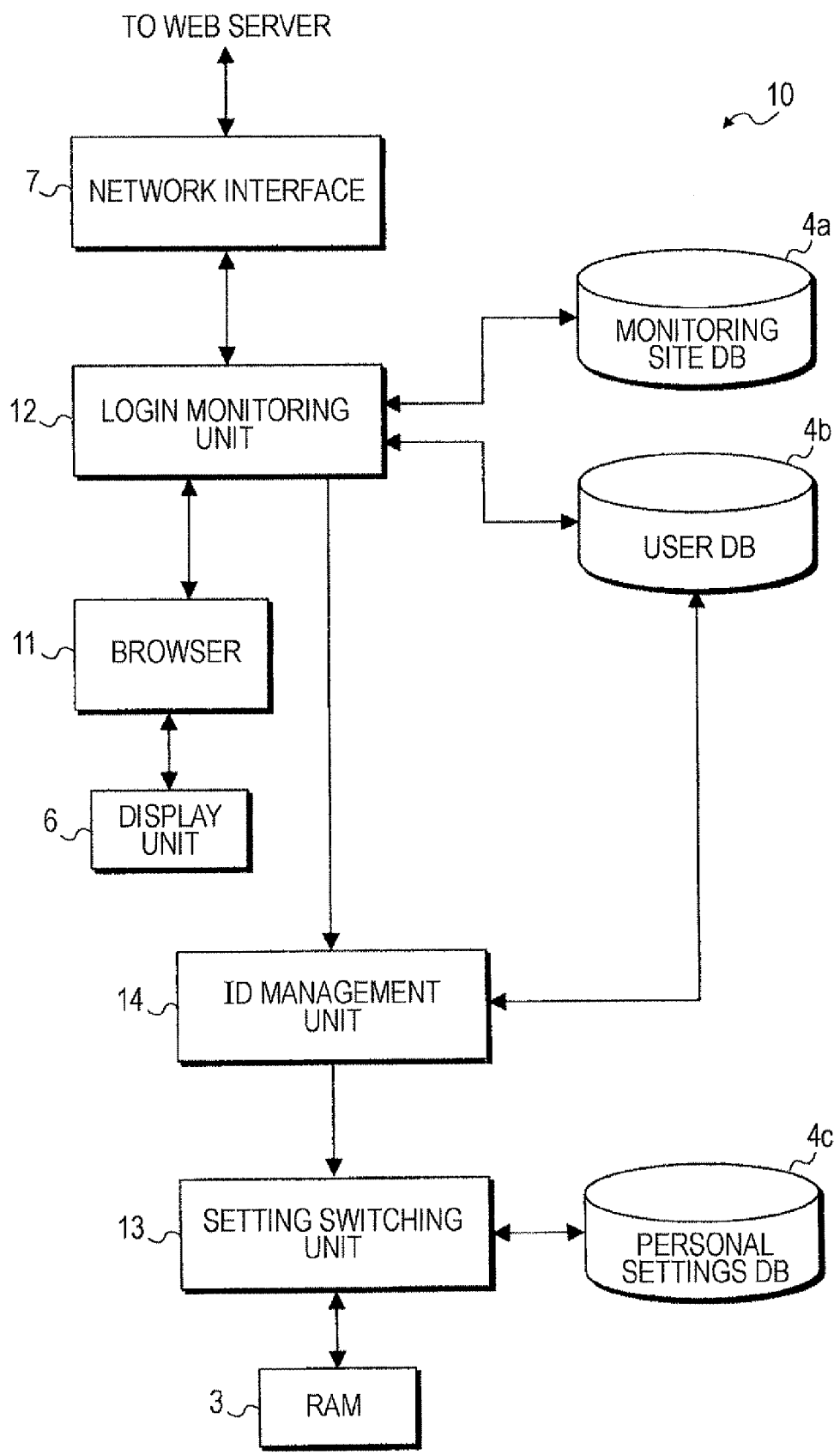
FIG. 15 illustrates functional configuration of an information processing apparatus.

In the information processing apparatus 10 according to the fourth exemplary embodiment, the control unit 1 can executes control programs stored in the ROM 2 or the HDD 4. FIG. 15 illustrates an exemplary information processing apparatus 10 including the control unit 1 serving as the browser 11, the login monitoring unit 12 and the setting switch unit 13 but also the function of an ID management unit 14. The processes performed by the browser 11 and the setting switch unit 13 are similar to the processes described in the first exemplary embodiment.

In the information processing apparatus 10 of the fourth exemplary embodiment, as when the login monitoring unit 12 of the first exemplary embodiment, when information is transferred from the browser 11 and is information transmitted to the web site of the URL contained in the monitoring site DB 4a, the login monitoring unit 12 extracts information (here, user ID) entered into a form (here, login form) that is contained in the monitoring site DB 4a, from the transferred information.

The login monitoring unit 12 specifies a user (user name) corresponding to the extracted user ID on the basis of the user DB 4b. When the extracted user ID is contained in the user DB 4b, the login monitoring unit 12 specifies a user name corresponding to the user ID. On the other hand, when the extracted user ID is not contained in the user DB 4b, the login monitoring unit 12 notifies the ID management unit 14 accordingly.

The ID management unit 14 instructs the display unit 6 to display an entry screen as illustrated in FIG. 16A. FIG. 16A, FIG. 16B, FIG. 16C, and FIG. 16D respectively illustrate examples of the configuration of an entry screen. FIG. 16A illustrates an entry screen for entering a discretionary user name. The user enters a user name that is entered before by himself or herself, or the user enters a discretionary user name if the user is new and then presses the OK button. When the user name is entered through the entry screen and the OK button is pressed, the ID management unit 14 judges whether the entered user name is contained in the user DB 4b.

When the entered user name is contained in the user DB 4b, the ID management unit 14 specifies the entered user name as a user at this point. On the other hand, when the entered user name is not contained in the user DB 4b, the ID management unit 14 newly enters the user name entered by the user into the user DB 4b as a new user. The ID management unit 14 enters the user ID, which is extracted from the information to be transmitted to the web site, into the user DB 4b in association with the user name and the destination web site to which the information is transmitted through the network interface 7.

As described above, in a state where the user (user name) is specified by the login monitoring unit 12 or the ID management unit 114 when the login monitoring unit 12 judges that the login process based on the information transmitted to the web site is successful on the basis of the information received from the web site. The setting switch unit 13 sets an operating environment based on the personal setting information corresponding to the user specified by the login monitoring unit 12 or the ID management unit 14.

Because the personal setting information corresponding to the user who is entered as a new user by the ID management unit 14 is not contained in the personal settings DB 4c, the setting switch unit 13 copies the default setting information stored in the HDD 4 to a file of a file name based on the user name entered by the user through the entry screen. The setting switch unit 13 enters the file name of the file, to which the default setting information is copied as described above, in the personal settings DB 4c in association with the user name entered by the user through the entry screen. Furthermore, the setting switch unit 13 reads the file name contained in the personal settings DB 4c as described above. The setting switch unit 13 stores the file name in given portions of the RAM 3 to thereby construct an operating environment based on the personal setting information.

The entry screen for each user to enter a discretionary user name to specify himself or herself is not limited to the entry screen illustrated in FIG. 16A. It may be, for example, one of entry screens as illustrated in FIG. 16B, FIG. 16C or FIG. 16D.

FIG. 16B illustrates the entry screen for entering an identification code for each user in place of a user name. When the entry screen illustrated in FIG. 16B is used, an identification code that is kept secretly by the user only is used in place of the user name that is contained in the user DB 4b. Initially set identification codes are recorded at the positions of "father" and "sister" in the user DB 4b. An identification code entered by the user through the entry screen is compared with the identification code recorded in the user DB 4b. That is, each user is specified by the identification code. With the above configuration, because each user is able to use his or her own operating environment by entering his or her own identification code, it is possible to prevent others from accidentally using his or her own operating environment.

When an identification code that is not contained in the user DB 4b is entered into the entry screen illustrated in FIG. 16B, the intention of adding a user is confirmed. And then the new identification code is added as a new user. The identification code may be not only a character string entered through a keyboard but also character strings, or the like, obtained by converting a characteristic amount, such as a mouth gesture, a face image, or a finger print image. In addition, it may be cooperatively connected to a system so that as an identification code is entered, a user ID and a password are automatically entered. By supporting these entry methods, user convenience may be enhanced.

FIG. 16C and FIG. 16D illustrate entry screens for accepting selection of user names that have been already contained in the user DB 4b. The entry screen of FIG. 16C displays a list of user names contained in the user DB 4b. The entry screen of FIG. 16D displays information for specifying a user name contained in the user DB 4b. When the entry screens illustrated in FIG. 16C and FIG. 16D are used, each user of the information processing apparatus 10 does not need to memorize a user name and identification code that are initially entered by himself or herself. Thus, it is more convenient for users. In addition, even for a user whose personal setting information is not contained, it is possible to provide an environment based on the personal setting information of any of the users that have been already contained and, as a result, each user is able to use a desired environment.

Figure 17:
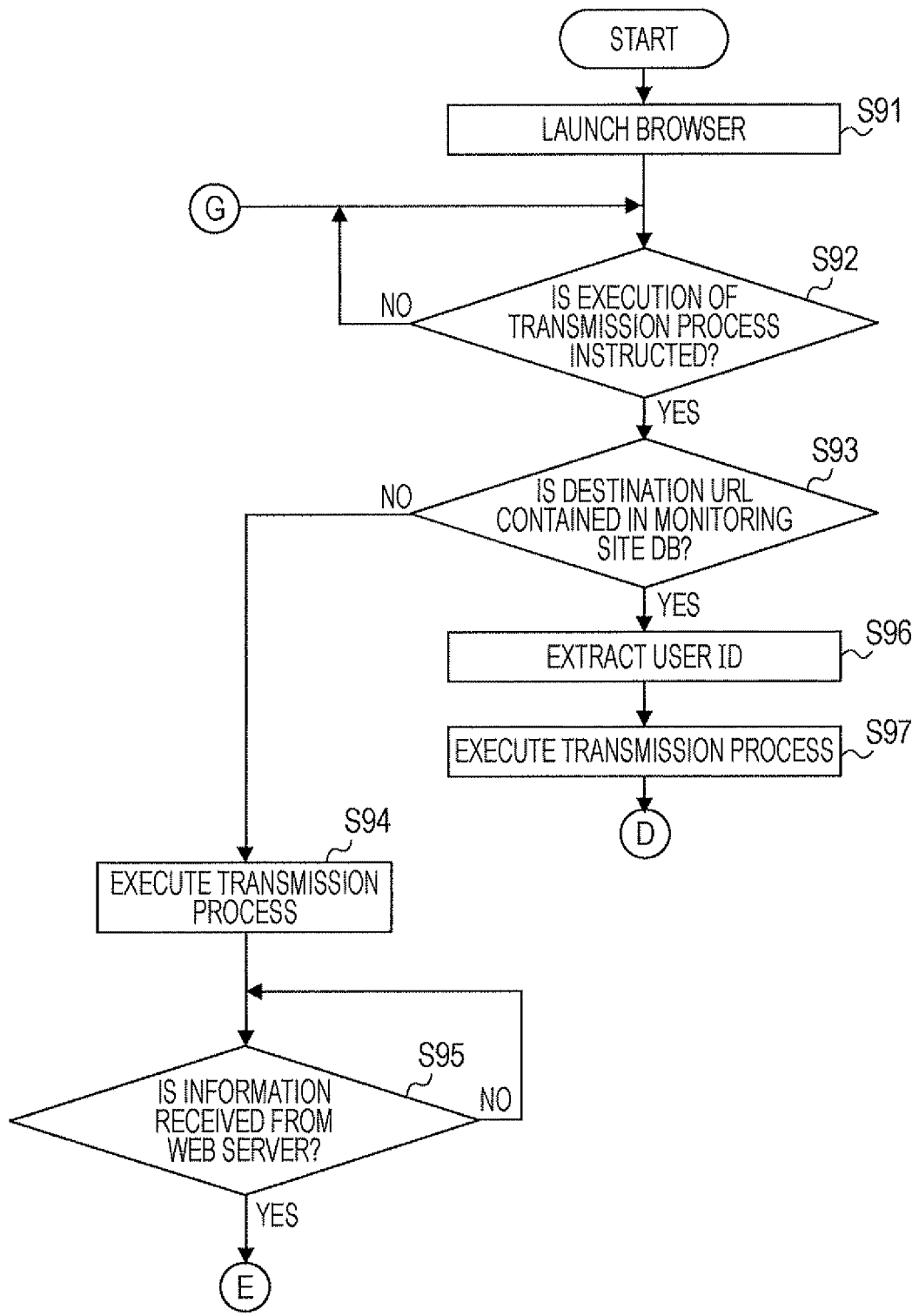
FIG. 17 illustrates exemplary operations of a process switching an operating environment.
Figure 18:
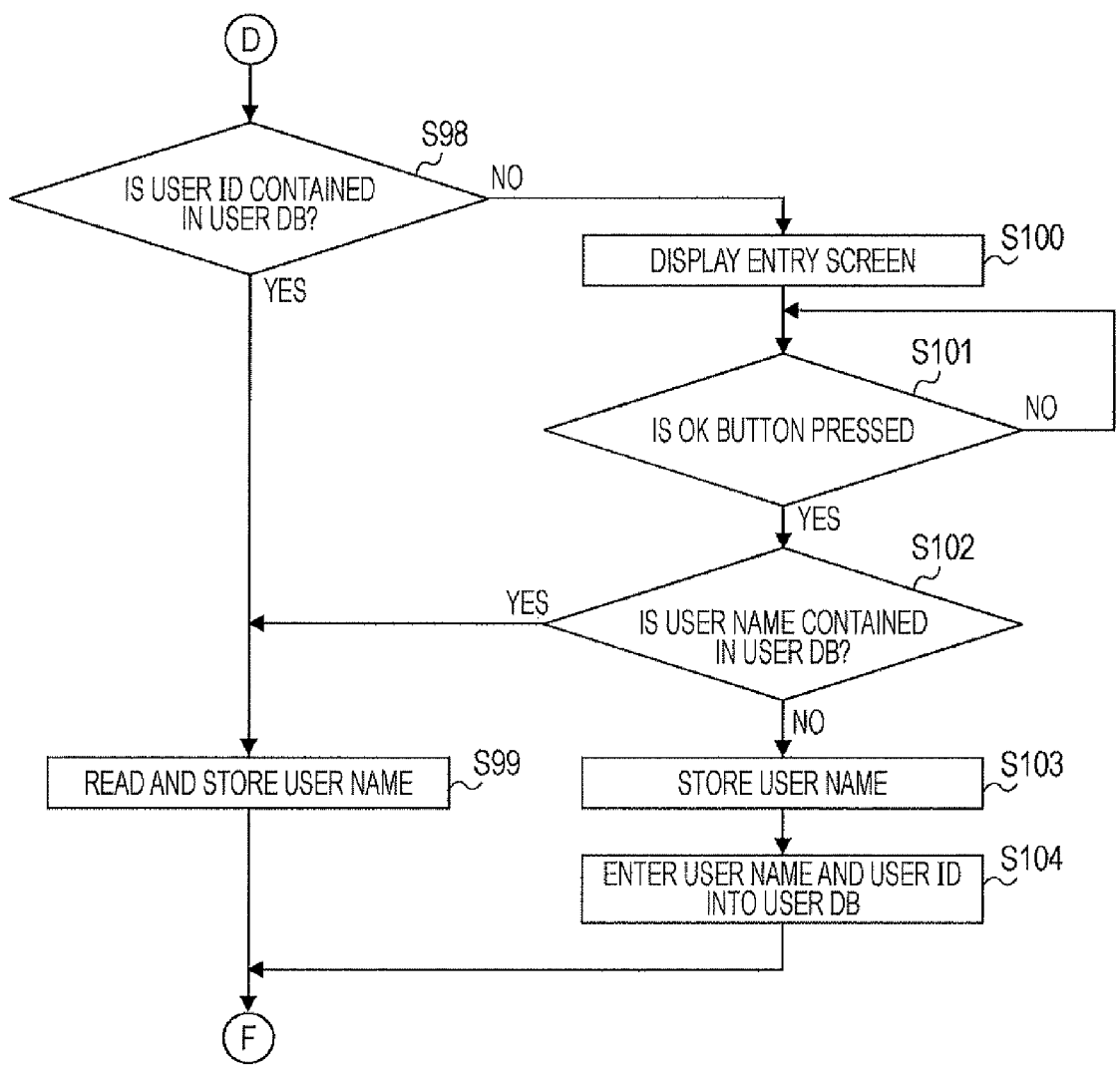
FIG. 18 illustrates exemplary operations of a process switching an operating environment.
Figure 19:
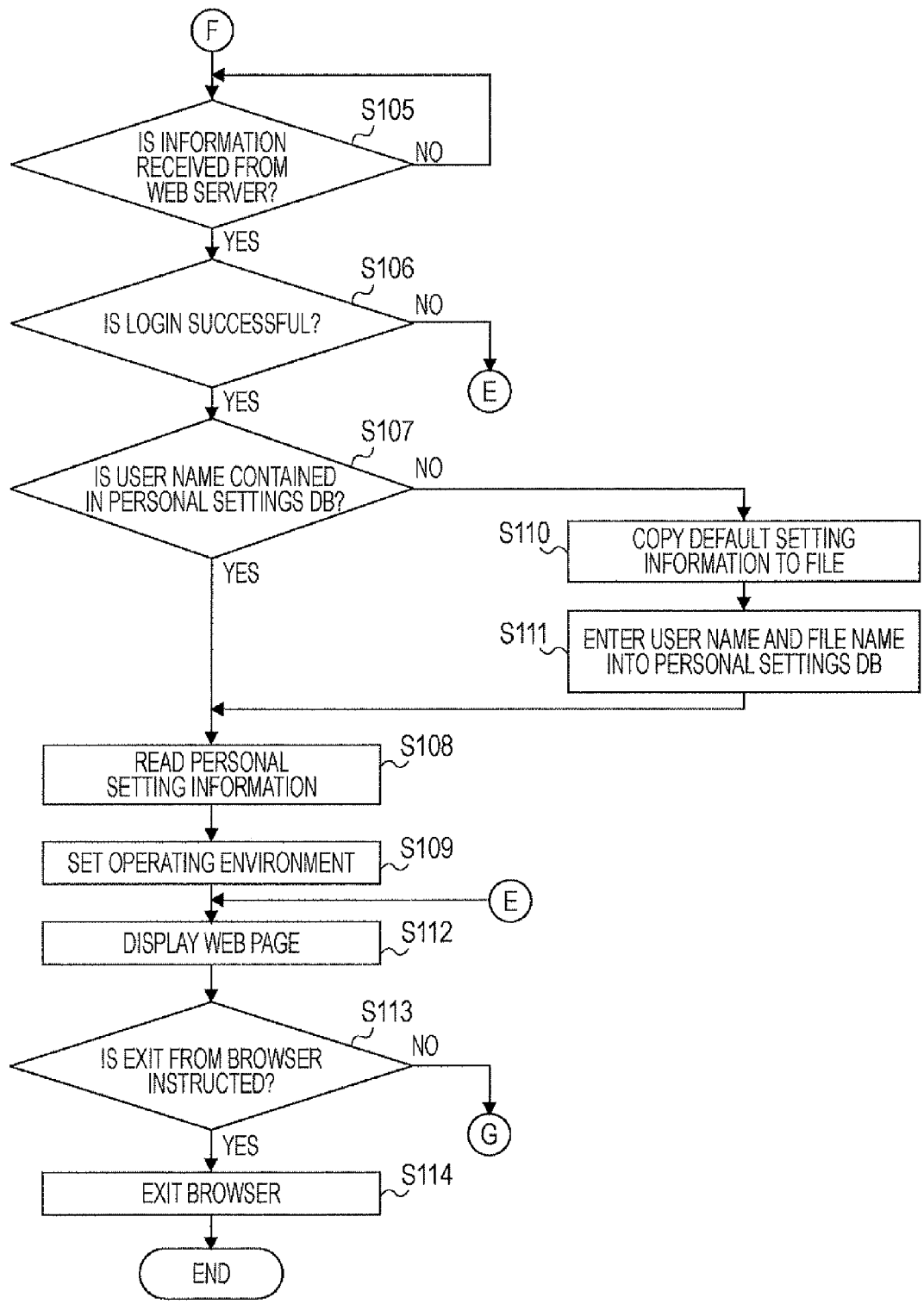
FIG. 19 illustrates exemplary operations of a process switching an operating environment.

Hereinafter, a process of switching an operating environment when the information processing apparatus 10 according to the fourth embodiment switches setting information corresponding to a user will be described with reference to an operation chart. FIG. 17 to FIG. 19 are operation charts that illustrate operations of a process of switching an operating environment. The following process is executed by the control unit 1 in accordance with a control program stored in the ROM 2 or HDD 4 of the information processing apparatus 10.

When the user of the information processing apparatus 10 instructs execution of the browser through the operating unit 5, the control unit 1 reads the browser stored in the HDD 4 onto the RAM 3. And then, the control unit 1 executes the browser to thereby launch the browser (operation S91). The control unit 1 (browser 11) judges whether the user operates the operating unit 5 to instruct execution of a process of transmitting information to a web server (operation S92). When it is judged that execution of the transmission process is not instructed (operation S92: NO), the control unit 1 waits until the instruction is issued.

When it is judged that execution of a process of transmitting information to a web server is instructed (operation S92: YES), the control unit 1 (login monitoring unit 12) judges whether the destination URL is contained in the monitoring site DB 4a (operation S93). When it is judged that the destination URL is not contained in the monitoring site DB 4a (operation S93: NO), the control unit 1 executes the transmission process of which execution is instructed in operation S92 (operation S94).

In addition, the control unit 1 judges whether information is received from the web server in reply to the information transmitted in the transmission process executed in operation S94 (operation S95). When it is judged that the information is not received from the web server (operation S95: NO), the control unit 1 waits until the information is received from the web server while performing other regular operations. When the control unit 1 judges that the information is received from the web server (operation S95: YES), the control unit 1 transfers the received web page to the display unit 6 for display (operation S112).

When it is judged that the destination URL is contained in the monitoring site DB 4a (operation S93: YES), the control unit 1 extracts a user ID from the information to be transmitted to the web server indicated by the destination URL (operation S96). The control unit 1 extracts the information (mail address), entered in correspondence with the form (login form) contained in the monitoring site DB 4a, from the information to be transmitted to the web server. The control unit 1 executes the transmission process of which execution is instructed in operation S92 (operation S97).

The control unit 1 (login monitoring unit 12) searches the user DB 4b for the user ID extracted in operation S96, and judges whether the extracted user ID is contained in the user DB 4b (operation S98). When it is judged that the user ID is contained in the user DB 4b (operation S98: YES), the control unit 1 reads the user name corresponding to the user ID from the user DB 4b. The control unit 1 temporarily stores the user name in the RAM 3 (operation S99).

When it is judged that the user ID extracted in operation S96 is not contained in the user DB 4b (operation S98: NO), the control unit 1 (ID management unit 14) instructs the display unit 6 to display the entry screen illustrated in FIG. 16A (operation 5100). The control unit 1 judges whether a user name is entered through the entry screen and the OK button is pressed (operation S101). When it is judged that the OK button is not pressed (operation S101: NO), the control unit 1 waits until the OK button is pressed.

When the control unit 1 judges that the OK button is pressed (operation S101: YES), the control unit 1 judges whether the user name entered through the entry screen is contained in the user DB 4b (operation S102). When it is judged that the entered user name is contained in the user DB 4b (operation S102: YES), the control unit 1 temporarily stores the entered user name in the RAM 3 (operation S99).

When the control unit 1 judges that the entered user name is not contained in the user DB 4b (operation S102: NO), the control unit 1 temporarily stores the entered user name in the RAM 3 (operation S103). In addition, the control unit 1 enters the entered user name and the user ID extracted in operation S96 into the user DB 4b in association with site information of the destination web site of the transmission process executed in operation S97 (operation S104).

The control unit 1 judges whether the information is received from the web server in reply to the information transmitted in the transmission process executed in operation S97 (operation S105). When it is judged that the information is not received from the web server (operation S105: NO), the control unit 1 waits until the information is received from the web server while performing other regular operations. When it is judged that the information is received from the web server (operation S105: YES), the control unit 1 (login monitoring unit 12) judges, based on the characteristic of the web page received from the web server, whether the login process that is requested on the basis of the information transmitted in operation S97 is successful or ends in failure (operation S106).

When the control unit 1 judges that the login process ends in failure (operation S106: NO), the control unit 1 proceeds with the process to operation S112 and transfers the received web page to the display unit 6 for display (operation S112). When it is judged that the login process is successful (operation S106: YES), the control unit 1 (setting switch unit 13) reads the user name stored in the RAM 3 in operation S99 or operation S103 and searches the personal settings DB 4c for the read user name. Thus, the control unit 1 judges whether the read user name is contained in the personal settings DB 4c (operation S107).

When it is judged that the user name is contained in the personal settings DB 4c (operation S107: YES), the control unit 1 reads the personal setting information corresponding to the user name from the personal settings DB 4c (operation S108). The control unit 1 stores the read personal setting information in given portions of the RAM 3 to thereby set an operating environment based on the personal setting information read from the personal settings DB 4c (operation S109).

When it is judged that the user name is not contained in the personal settings DB 4c (operation S107: NO), the control unit 1 reads the user name stored in the RAM 3 in operation S99 or operation S103. And then, the control unit 1 copies default setting information stored in the HDD 4 to a file of a file name based on the user name read from the RAM 3 (operation S110). The control unit 1 enters the user name read from the RAM 3 and the file name of the file, into which the default setting information is copied, in association with each other into the personal settings DB 4c (operation S111).

The control unit 1 (setting switch unit 13) reads the personal setting information, corresponding to the user name read from the RAM 3, from the personal settings DB 4c entered in operation S111 (operation S108). The control unit 1 stores the read personal setting information in given portions of the RAM 3 to thereby set an operating environment based on the personal setting information read from the personal settings DB 4c (operation S109).

The control unit 1 transfers the web page received from the web server in operation S105 to the display unit 6 for display (operation S112). The control unit 1 judges whether the user of the information processing apparatus 10 operates the operating unit 5 to instruct an exit from the browser (operation S113). When it is judged that exit from the browser is instructed (operation S113: YES), the control unit 1 ends execution of the browser to exit from the browser (operation S114). When it is judged that the exit from the browser is not instructed (operation S113: NO), the control unit 1 returns the process to operation S92 and repeats the process of the operations S92 to S114.

Through the process, even when one user logs in to respective web sites using user IDs (mail addresses) having different character strings on the left to "@", the information processing apparatus 10 of the fourth exemplary embodiment manages them as the same user on the basis of the user names, identification codes, or the like, for identifying respective users. Thus, it is possible to use the operating environment based on the same personal setting information even in the web sites logged in using different user IDs.

The e information processing apparatus 10 of the fourth exemplary embodiment may be configured as in the information processing apparatus 10 according to the exemplary first, second or third embodiments. When configured as when the information processing apparatus 10 of the second embodiment, the information processing apparatus 10 is able to specify a user by extracting the user ID from the information to be transmitted to the web site, even when information is transmitted to a web site that is not contained in the monitoring site DB 4a but when the information to be transmitted includes a user ID which specifies a user. The information processing apparatus 10 provides the operating environment based on the personal settings corresponding to the specified user.

In addition, when configured the information processing apparatus 10 according to the third embodiment, in spite of whether the login process to a web site is successful, the information processing apparatus 10 is able to specify a user on the basis of the information to be transmitted to the web site. The information processing apparatus 10 provides the operating environment based on the personal settings corresponding to the specified user.

The information processing apparatus according to a fifth exemplary embodiment has components similar to those of the information processing apparatus 10 according to the first exemplary embodiment. Like reference numerals denote like components, and the description thereof is omitted.

The information processing apparatus 10 according to any of the exemplary first to fourth embodiments may be configured to switch an operating environment based on the personal setting information corresponding to the specified user when a user is specified by extracting a user ID from information to be transmitted to a web server.

In addition to the example of the configuration of the first to fourth embodiments, the information processing apparatus 10 according to the fifth embodiment may be configured to return the operating environment to an initial state on the basis of the default setting information stored in the HDD 4 when no operation is performed for a given period of time or more.

Hereinafter, in the information processing apparatus 10 according to the fifth embodiment, the control unit 1 can execute control programs stored in the ROM 2 or the HDD 4. The control unit 1 in the fifth embodiment implements such various functions as the browser 11, the login monitoring unit 12 and the setting switch unit 13. The processes performed by the browser 11 and login monitoring unit 12 are similar to the processes described in the first exemplary embodiment.

In the information processing apparatus 10 according to the fifth embodiment, the control unit 1 (setting switch unit 13) operates as a timer that times a given period of time on the basis of a time clocked by its own clock, and times a non-operation time during which the operating unit 5 is not operated. When the operating unit 5 is operated by the user of the information processing apparatus 10, the control unit 1 resets a timer process and initiates to time a non-operation time. When the non-operation time is equal to or exceeds a given period of time (for example, about several tens minutes to about several hours), the control unit 1 reads the default setting information from the HDD 4. The control unit 1 stores the read default setting information in given portions of the RAM 3 to thereby set the operating environment based on the default setting information.

Other processes, such as the process in which the login monitoring unit 12 newly enters the user name of the user specified on the basis of the information transferred from the browser 11 into the user DB 4b, the process in which the login monitoring unit 12 determines, based on the web page received from the web server, whether the login process is successful, the process in which the login monitoring unit 12 newly enters the personal setting information corresponding to the user into the user DB 4b, are similar to the processes described in the first exemplary embodiment.

Figure 20:
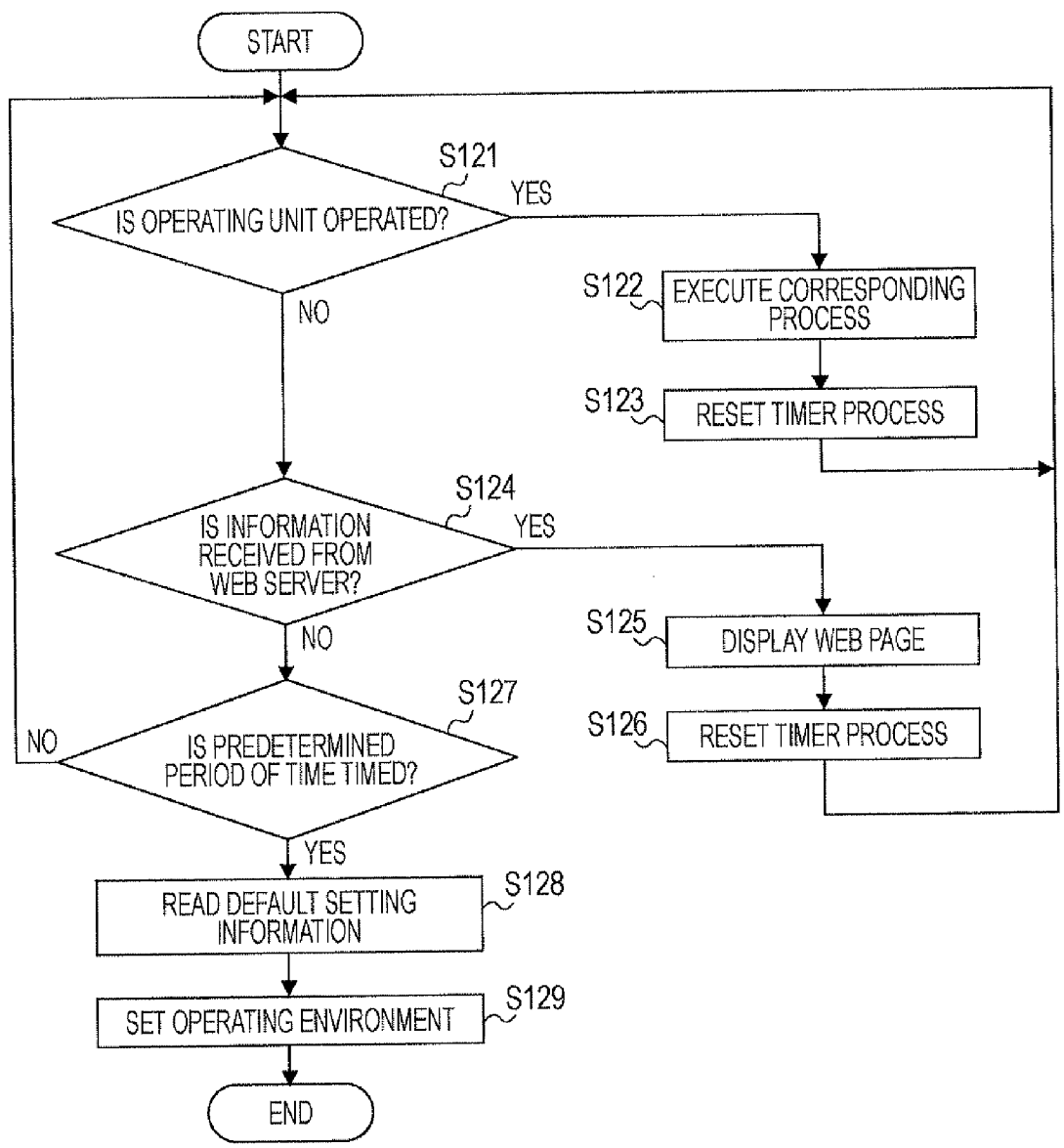
FIG. 20 illustrates exemplary operations of a process switching to a default operating environment.

In the information processing apparatus 10 according to a fifth exemplary embodiment, when the non-operation time is equal to or exceeds a given period of time will be described with reference to an operation chart, a process of switching the operating environment by switching to the default setting information will be described with reference to an operation flowchart. FIG. 20 illustrates operations of a process of switching to a default operating environment. The process can be executed by the control unit 1 in accordance with a control program stored in the ROM 2 or HDD 4 of the information processing apparatus 10.

The control unit 1 of the information processing apparatus 10 judges whether the operating unit 5 is operated by the user 5 (operation S121). When it is judged that the operating unit 5 is operated (operation 5121: YES), the control unit 1 executes the corresponding process (operation 5122). The control unit 1 resets the timer process that times a given period of time (operation S123) and returns the process to operation S121. When the control unit 1 judges that the operating unit 5 is not operated (operation S121: NO), the control unit 1 judges whether information is received from an external web server through the network interface 7 (operation S124).

When the control unit 1 judges that information is received from an external web server (operation S124: YES), the control unit 1 transfers the received web page to the display unit 6 for display (operation S125). The control unit 1 resets the timer process that times a given period of time (operation S126) and returns the process to operation S121. When it is judged that information is not received from an external web server (operation S124: NO), the control unit 1 judges whether a given period of time is timed through the timer process that is reset in operation S123 or in operation S126 (operation S127). When it is judged that a given period of time is not timed (operation S127: NO), the control unit 1 returns the process to operation S121.

When it is judged that a given period of time is timed (operation S127: YES), the control unit 1 reads the default setting information stored in the HDD 4 (operation S128) and stores the read default setting information in given portions of the RAM 3 to thereby set the operating environment based on the default setting information (operation S129), thus ending the process of switching to the default operating environment.

Through the process, each time each user of the information processing apparatus 10 logs in to a web site, switches and provides an operating environment based on the personal setting information corresponding to the user. In addition, the information processing apparatus 10, when no operation is performed for a given period of time or more, returns the operating environment to an initial state based on the default setting information. Thus, it is possible to prevent an operating environment from being erroneously used by other users.

Timing at which the operating environment is returned to the default operating environment may be when the information processing apparatus 10 enters a standby state other than when the non-operation time is equal to or exceeds a given period of time as described above. In addition, it is not only limited to time a non-operation time through the timer process by the control unit 1 as described above. Elapsed time of a non-operation time of the information processing apparatus 10, transition between an operating state and a standby state, and the like, are checked, for example, by utilizing a status management API (Application Program Interface) of an OS (Operating System), and it is judged whether it is necessary to switch when the non-operation time is equal to or exceeds a predetermined period of time.

In the information processing apparatus 10, when the browser 11 transmits information to a web site on a web server through the network interface 7, the login monitoring unit 12 judges whether the destination of the information transferred from the browser 11 is any of URLs contained in the monitoring site DB 4a. In contrast, the information processing device 10 may be configured so that, when information received by the browser 11 from the web server through the network interface 7, includes information by which a user can be specified, the user is specified on the basis of the information (web page) received from the web server.

The login monitoring unit 12 judges whether the web server, which is the destination of information transferred from the network interface 7, that is, which is the source of the received web page, has any one of URLs contained in the monitoring site DB 4a. When the login monitoring unit 12 judges that the source web server has any one of URLs contained in the monitoring site DB 4a, the login monitoring unit 12 may extract a user ID (mail address), entered into a form that is contained in the monitoring site DB 4a, from the information received from the web server.

In the information processing apparatus 10, when the destination of information transferred from the browser 11 is any one of URLs contained in the monitoring site DB 4a, the login monitoring unit 12 extracts a user ID from the information to be transmitted to the URL. In contrast, it is applicable that, without providing the monitoring site DB 4a, it is judged, for all pieces of information to be transmitted to web sites, whether a text box (form) related to specific information (keyword), such as "<input name=login>", "<input name=user>", or "<input name password>" is included, and when it is judged that the text box is included, a user ID is extracted on the basis of that piece of information.

In addition, the information processing device 10 may be configured to not only judge, for all pieces of information to be transmitted to web sites, whether a specific text box is included but also judge whether a user ID or user name contained in the user DB 4b is included and, when it is judged that a user ID or user name is included, and extract the user ID or user name.

Since a monitoring site DB 4a is not included, a process of selecting a web site to be entered into the monitoring site DB 4a and a process of entering the selected web site into the monitoring site DB 4a are not necessary. However, because all pieces of information to be transmitted to web sites can be monitored, processing load can increase, and erroneously switch an operating environment.

In the exemplary information processing apparatus 10, when the browser 11 transmits information to a web site, information is transferred through the login monitoring unit 12 to the network interface 7. The above configuration may be implemented, for example, in the case in which an SSL functional block that performs an encryption process and a decryption process in accordance with an SSL (Secure Socket Layer) protocol is provided between the login monitoring unit 12 and the network interface 7, in which the SSL functional block is incorporated in the network interface 7, or in which no SSL functional block is provided. In addition, the login monitoring unit 12 may be incorporated, for example, in a network driver and implemented as a proxy in a local.

In contrast, when the browser 11 incorporates the SSL functional block, information output from the browser 11 is already encrypted by the SSL functional block. Thus, the configuration may not be able to be implemented. In this case, the login monitoring unit 12 can be incorporated in the browser 11 as an extension of the browser 11. That is, configured so that encrypted information is transferred from the browser 11 to the network interface 7, whereas unencrypted information is transferred to the login monitoring unit 12 incorporated in the browser 11. In this case, it is possible to support the browser 11 that incorporates the SSL functional block; however, it is necessary to develop an extension for each browser 11.

In the exemplary information processing apparatuses 10, the personal setting information that is customized for each user is a user dictionary and history information. Information that may be configured for each user may be, in addition to these pieces of information, for example, contents of a registry of autocomplete in the control unit 1, contents of a favorites folder set in a browser, contents of a cookie, settings of a web contents filter, settings of launching or exiting input/output support software, settings of various applications, and the like.

By updating the contents of a registry of autocomplete in the control unit 1, it is easy to perform a conversion process to words that are frequently used by the user on the basis of a history of entry by each user. In addition, by switching the contents of a favorite folder, it is easy to access web sites set in the favorite folder. Not only link information to each web site but also display order in which site information of each web site is displayed as favorites is also entered in the favorite folder. Thus, it is possible to further easily select web sites of which display orders are set toward the front.

In addition, when favorites of each user are displayed and, subsequently, site information of web sites set in the favorites by other users is displayed, it is easy to find their favorite web sites, and it is also easy to access favorite web sites set by other users.

In addition, by switching the contents of a cookie, it is possible to change an account corresponding to each web site. For example, in a web site that automatically distributes news, it is possible to automatically distribute news to a user of an account stored in the cookie. Furthermore, by switching the settings of a web contents filter, it is possible to inhibit access to a hazardous site while a child is using the information processing apparatus 10.

By switching the settings of launching or exiting the input/output support software, it is possible to automatically launch or exit input/output software that performs a mouse gesture, a keyboard shortcut, changing the size of character display, changing the resolution, changing the volume, and the like, depending on a user. Thus, it is possible to implement an input/output operation that matches a user's preference. In addition, by switching the settings of various applications, it is possible to use various applications under an environment that is comfortable for each user to use. As described above, in apparatuses that include an exemplary information processing apparatus, by switching various pieces of setting information for each user, it is possible to improve the usability for users.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing apparatus comprising:
   a setting information storage which stores setting information related to an operating environment of the information processing apparatus in association with identification information for identifying one of at least first and second users; the operating environment including at least one of a user dictionary and a history;
   a monitoring site storage which stores site information for identifying a web site and a name of a form in which login information is to be entered, the login information being for logging in the web site;
   a processor configured to:
      transmit information including the login information that requests access to an external web server with regard to the web site and receives, from the external web server, information that indicates whether access is permitted to the transmitted information;
      judge whether the information received from the external web server is information which indicates access permission;
      specify one of the at least first and second users on the basis of the transmitted login information when it is judged that the information received from the external web server is the information indicating access permission;
      read the setting information stored in the setting information storage in association with the identification information of the one of at least first and second users that is specified; and
      set the operating environment on the basis of the read setting information.

2. An information processing apparatus comprising:
   a setting information storage which stores setting information related to an operating environment of the information processing apparatus in association with identification information for identifying one of at least first and second users; the operating environment including at least one of a user dictionary and a history;
   a monitoring site storage which stores site information for identifying a web site and a name of a form in which login information is to be entered, the login information being for logging in the web site;
   a processor configured to:
      transmit and receive information to and from a web server;
      judge whether the information that the processor transmits to or receives from the web server includes the login information;
      extract the login information from the information that the processor transmits to or receives from the web server when the information is judged to include the login information;
      specify one of the at least first and second users on the basis of the login information extracted from the information that the processor transmits to or receives from the web server;
      read the setting information stored in the setting information storage in association with the identification information of the one of at least first and second users that is specified; and
      set the operating environment on the basis of the read setting information,
   wherein the information processing apparatus includes a target information storage storing target information for transmitting or receiving information, wherein:
      the processor is further configured to execute determining, when the processor transmits or receives information to or from the web server, whether the web server has memorized the target information stored in the target information storage,
      when it is determined that the web server has memorized the target information stored in the target information storage, the processor judges whether the information that the processor transmits to or receives from the web server includes the given information, wherein
      when the processor determines that the web server is not contained in the target information stored in the target information storage, the processor judges whether the information that the processor transmits to or receives from the web server includes given information,
      the processor is further configured to execute entering target information that the processor transmits to or receives from the web server when the processor determines that the web server is not contained in the target information stored in the target information storage and when the processor judges that the information transmitted to or received from the web server includes the given information.

3. The information processing apparatus according to claim 1, further comprising:
   a given setting information storage that stores given setting information,
   wherein the processor is further configured to execute storing given setting information stored in the given setting information storage in association with identification information of one of the at least first and second users specified in the setting information storage when the setting information corresponding to the one of the at least first and second users specified by the processor is not stored in the setting information storage, and
   wherein the processor reads the given setting information stored in the setting information storage and sets an operating environment on the basis of the setting information.

4. The information processing apparatus according to claim 2, further comprising:
   a given setting information storage unit storing given setting information,
   wherein the processor is further configured to execute storing given setting information stored in the given setting information storage in association with identification information of one of the at least first and second users specified in the setting information storage when the setting information corresponding to the one of the at least first and second users specified by the processor is not stored in the setting information storage, and wherein the processor reads the given setting information stored in the setting information storage and sets an operating environment on the basis of the setting information.

5. The information processing apparatus according to claim 1, wherein:

the processor is further configured to execute accepting selection of any one of plural pieces of setting information stored in the setting information storage when setting information corresponding to the one of at least first and second users specified by the processor is not stored in the setting information storage and the processor reads the selected piece of setting information from the setting information storage and sets an operating environment on the basis of the selected piece of setting information.

6. The information processing apparatus according to claim 2, wherein:

the processor is further configured to execute accepting selection of any one of plural pieces of setting information stored in the setting information storage when setting information corresponding to the one of the at least first and second users specified by the processor is not stored in the setting information storage, and the processor reads the selected piece of setting information from the setting information storage and sets an operating environment on the basis of the selected piece of setting information.

7. An information processing apparatus comprising:

a setting information storage which stores setting information related to an operating environment of the information processing apparatus in association with identification information for identifying one of at least first and second users; the operating environment including at least one of a user dictionary and a history;

a monitoring site storage which stores site information for identifying a web site and a name of a form in which login information is to be entered, the login information being for logging in the web site;

a processor configured to:

transmit and receive information to and from a web server;

judge whether the information that the processor transmits to or receives from the web server includes the login information;

extract the login information from the information that the processor transmits to or receives from the web server when the information is judged to include the login information;

specify one of the at least first and second users on the basis of the login information extracted from the information that the processor transmits to or receives from the web server;

read the setting information stored in the setting information storage in association with the identification information of the one of at least first and second users that is specified; and set the operating environment on the basis of the read setting information, wherein the processor is further configured to execute:

operating by one of the at least first and second users;

timing a period of time during which the operating is not operated, and setting an operating environment on the basis of given setting information when the period of time timed by the timing is equal to or exceeds a given period of time.

8. The information processing apparatus according to claim 1, wherein the processor is further configured to execute:

operating by one of the at least first and second users;

timing a period of time during which the operating is not operated, and the processor sets an operating environment on the basis of given setting information when the period of time timed by the timing is equal to or exceeds a given period of time.

9. The information processing apparatus according to claim 2, wherein the processor is further configured to execute:

operating by one of the at least first and second users;

timing a period of time during which the operating is not operated, and the processor sets an operating environment on the basis of given setting information when the period of time timed by the timing is equal to or exceeds a given period of time.

10. An information processing method of causing a computer to execute as an information processing apparatus, the information processing method comprising:

storing site information for identifying a web site and a name of a form in which login information is to be entered, the login information being for logging in the web site;

transmitting information including the login information that requests access to an external web server with regard to the web site and receiving, from the external web server, information that indicates whether access is permitted to the transmitted information;

judging whether the information received from the external web server is information which indicates access permission;

specifying one of at least first and second users on the basis of the transmitted login information when it is judged that the information received from the external web server is the information indicating access permission; and setting an operating environment of the information processing apparatus on the basis of setting information corresponding to the specified one of the at least first and second users, the operating environment including at least one of a user dictionary and a history.

11. A non-transitory computer-readable storage medium storing a program causing a computer to execute a process, the process comprising:

storing site information for identifying a web site and a name of a form in which login information is to be entered, the login information being for logging in the web site;

transmitting information including the login information that requests access to an external web server with regard to the web site and receiving, from the external web server, information that indicates whether access is permitted to the transmitted information;

judging whether the information received from the external web server is information which indicates access permission;

specifying one of at least first and second users on the basis of the transmitted login information when it is judged that the information received from the external web server is the information indicating access permission; and setting an operating environment on the basis of setting information corresponding to the specified one of the at least first and second users, the operating environment including at least one of a user dictionary and a history.

12. An information processing apparatus comprising:

a setting information storage which stores setting information related to an operating environment of the information processing apparatus in association with identification information for identifying one of at least first and second users; the operating environment including at least one of a user dictionary and a history;

a monitoring site storage which stores site information for identifying a web site and a name of a form in which login information is to be entered, the login information being for logging in the web site;

a processor configured to:

transmit and receive information to and from a web server;

determine whether the web server is a web server related to the web site of which the site information is stored in the monitoring site storage when the information is transmitted and received to and from the web server;

determine whether the form name stored in the monitoring site storage is included in the information when the web server is determined to be the web server related to the web site;

extract the form name from the information when the form name is determined to be included in the information;

specify one of the at least first and second users on the basis of the extracted form name;

read the setting information stored in the setting information storage in association with the identification information of the specified one of at least first and second users; and set the operating environment on the basis of the read setting information.

13. The information processing apparatus according to claim 1, wherein the information indicating access permission includes a web page including successful displays information indicating that a login to the web site is successful.

14. The information processing apparatus according to claim 1, wherein the information indicating access permission includes a web page including a logout button for instructing execution of a logout process.

15. The information processing apparatus according to claim 7, wherein the operating environment on the basis of given setting information is an operating environment which is set to the information processing apparatus when a user is not specified.

16. The information processing apparatus according to claim 8, wherein the operating environment on the basis of given setting information is an operating environment which is set to the information processing apparatus when a user is not specified.

17. The information processing apparatus according to claim 9, wherein the operating environment on the basis of given setting information is an operating environment which is set to the information processing apparatus when a user is not specified.

* * * * *

UNITED STATES PATENT AND TRADEMARK OFFICE
CERTIFICATE OF CORRECTION

PATENT NO. : 8,812,753 B2
APPLICATION NO. : 12/362061
DATED : August 19, 2014
INVENTOR(S) : Motoshi Sumioka et al.

Page 1 of 1

It is certified that error appears in the above-identified patent and that said Letters Patent is hereby corrected as shown below:

In the Claims

Column 30, Line 64, in Claim 4, after "storage" delete "unit".

Signed and Sealed this
Eighteenth Day of November, 2014

Michelle K. Lee
*Deputy Director of the United States Patent and Trademark Office*